(12) United States Patent
Sato et al.

(10) Patent No.: US 6,268,867 B1
(45) Date of Patent: Jul. 31, 2001

(54) METHOD AND APPARATUS FOR COLOR CORRECTION AND APPARATUS FOR APPLYING COLOR CORRECTION

(75) Inventors: Tsuneo Sato; Masayuki Saito, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/077,968

(22) PCT Filed: Oct. 29, 1996

(86) PCT No.: PCT/JP96/03169
§ 371 Date: Jun. 15, 1998
§ 102(e) Date: Jun. 15, 1998

(87) PCT Pub. No.: WO98/19452
PCT Pub. Date: May 7, 1998

(51) Int. Cl.$^7$ .................................... G06T 11/40
(52) U.S. Cl. .............................................. 345/431
(58) Field of Search .................................. 345/150–153, 345/431, 423, 103, 104; 382/162, 167

(56) References Cited

U.S. PATENT DOCUMENTS

| 5,012,333 | 4/1991 | Lee et al. |
| 5,333,070 | 7/1994 | Ichikawa. |
| 5,581,376 | * 12/1996 | Harrington ............................. 358/518 |
| 5,592,312 | * 1/1997 | Noguchi ................................. 358/525 |
| 5,751,845 | * 5/1998 | Dorff et al. ........................... 382/162 |
| 5,809,213 | * 9/1998 | Bhattacharjya ....................... 395/106 |

FOREIGN PATENT DOCUMENTS

| 1-103445 | 4/1989 | (JP). |
| 3-229573 | 10/1991 | (JP). |
| 4-51670 | 6/1992 | (JP). |
| 5-120416 | 5/1993 | (JP). |
| 6-21224 | 1/1994 | (JP). |
| 7-99587 | 4/1995 | (JP). |
| 7-99589 | 4/1995 | (JP). |

OTHER PUBLICATIONS

Computer Graphics: Principles and Practice, Foley, DPUB Jun. 29, 1990, Addison–Wesley Pub. Co., p. 580–598.*

* cited by examiner

Primary Examiner—Almis R. Jankus
Assistant Examiner—G. Cunningham

(57) ABSTRACT

A color correction device and method separates achromatic color from chromatic color and independently controls the color. Color interpolation is performed along the locus of the color change of an input signal by dividing a color space of the input signal into blocks to surely include the locus changing from black to white passing through a center part based on the locus (chromatic locus) changing from black to white surrounding a color region to be handled by an input image equipment and the locus (achromatic locus) changing from black to white passing through the center part of the color region to be handled by the input image equipment. An achromatic part present in the center part of the color space is separately handled from a chromatic part present in its peripheral part.

18 Claims, 14 Drawing Sheets

LIGHTNESS DIRECTION

HUE DIRECTION

SATURATION DIRECTION

| NUMBER OF LOCUS DIVISION POINT | COORDINATE VALUE OF INPUT DIVISION POINT | COORDINATE VALUE OF OUTPUT DIVISION POINT |
|---|---|---|
| GRAY 0 | (1bk00,1bk01,1bk02) | (0bk00,0bk01,0bk02) |
| GRAY 1 | (1bk10,1bk11,1bk12) | (0bk10,0bk11,0bk12) |
| GRAY 2 | (1bk20,1bk21,1bk22) | (0bk20,0bk21,0bk22) |
| ⋮ | ⋮ | ⋮ |
| GRAY n | (1bkn0,1bkn1,1bkn2) | (0bkn0,0bkn1,0bkn2) |
| RED 0 | (1r00,1r01,1r02) | (0r00,0r01,0r02) |
| ⋮ | ⋮ | ⋮ |
| RED n | (1m0,1m1,1m2) | (0m0,0m1,0m2) |
| YELLOW 0 | (1y00,1y01,1y02) | (0y00,0y01,0y02) |
| ⋮ | ⋮ | ⋮ |
| YELLLOW n | (1yn0,1yn1,1yn2) | (0yn0,0m1,0m2) |
| ⋮ | ⋮ | ⋮ | a : PROCEDURE TO PREPARE, CORRECT AND REGULATE THE OUTPUT TABLE

METHOD AND APPARATUS FOR COLOR CORRECTION AND APPARATUS FOR APPLYING COLOR CORRECTION

This application is the national phase under 35 U.S.C. §371 of prior PCT International Application No. PCT/JP96/03169, which has an International filing date of Oct. 29, 1996, which designated the United States of America, the entire contents of which are hereby incorporated by reference.

TECHNICAL FIELD

The present invention relates to a color correction device, a color correction method and a color correction application device which applies the color correction method to control the color of the system to handle color image equipment.

BACKGROUND ART

FIG. 25 is a block diagram of a conventional color conversion method and a color conversion device, as disclosed for example in Japanese Unexamined Patent Publication No. 6-86059 and referred to herein as "conventional example 1."

In FIG. 25, R1 denotes an input γ-correction part which performs γ-correction of R, G and B signals read by a scanner part, R2 denotes a pre-processing part which generates the minimum signal L by judging the magnitude of the γ-corrected R, G and B signals, generates the differential signals X,Y between the input R, G and B signals and the minimum signal L, and generates the region selection signal S, R3 denotes a color conversion parameter memory part which accumulates the color conversion parameter with the region selection signal S as the address, R4 denotes an achromatic output signal generation part which generates the output signal $P_1$ corresponding to the achromatic input based on the minimum signal L, R5 denotes an interpolation operating part which generates the output $P_2$ by interpolating the space to be formed by the minimum signal L and the differential signals X,Y by the triangular prismatic interpolation, R6 denotes a limit processing part which performs the limit processing by adding the outputs $P_1$, $P_2$, R7 denotes an output γ-correction part which prepares the output signal P through γ-correction of the limit-processed signal $P_3$, and the output signals P generated by the output γ-correction part R7 are the ink quantity control signal of Y (yellow), M (magenta), C (cyan), etc., and supplied to the printer part after gradation processing in a systematic dither method by a dither processing part.

Conventional example 1 having the above-mentioned constitution is further explained as follows. The input γ-correction part R1 performs γ-correction of the signal read by a scanner part with linear reflectance using a look-up table method of R=G=B for the achromatic input. The pre-processing part R2 judges the magnitude of R, G and B signals based on the input R, G and B signals, sets the region selection signal S, and generates the minimum signal L and the differential signals X,Y between the minimum signal L and the input R, G and B signals.

The differential signals are determined as follows.

if ((R≧G) & (G≧B)), S=0, L=B, X=R−L, Y=G−L
if ((G>R) & (R≧B)), S=1, L=B, X=G−L, Y=R−L
if ((G≧B) & (B>R)), S=2, L=R, X=G−L, Y=B−L
if ((B>G) & (G>R)), S=3, L=R, X=B−L, Y=G−L
if ((B>R) & (R≧G)), S=4, L=G, X=B−L, Y=R−L
if ((R≧B) & (B>G)), S=5, L=G, X=R−L, Y=B−L

The color conversion parameter memory part R3 is a memory with the region selection signal S as the address input, and four color conversion parameters $a_{s0}$, $a_{s1}$, $a_{s2}$ and $a_{s3}$ set for each below-mentioned unit triangular prism are accumulated as a set. The achromatic signal generation part R4 outputs $P_1$=R(=G=B) when R=G=B. The achromatic signal generation part R4 comprises a through circuit where $P_1$=L. The interpolation operating part R5 obtains the output $P_2$ by performing interpolation of the triangular prism based on the minimum signal L and the differential signals X,Y from the pre-processing part R2 and the color conversion parameters $a_{si}$ read from the color conversion parameter memory part R3.

Where the output value set at the apex (lattice point) of the triangular prism is $T_i$ ($T_0$, $T_1$, $T_2$, $T_3$), the output value $P_2$ in the coordinate (L, X, Y) in the unit triangular prism is calculated by the following formula, where the lattice point value on the L-axis (X=0, Y=0) is zero, and L, X and Y are assumed to be normalized to 0~1.

$$P_2 = T_0 \cdot X + (T_2 - T_0) \cdot L \cdot X + T_1 \cdot Y + (T_3 - T_1) \cdot L \cdot Y$$

The limit processing part R6 adds the output value $P_1$ to the output value $P_2$, and outputs the output value $P_3$ through the over-flow and under-flow processing. That means, if ($P_1$+$P_2$>255), $P_3$=255
if ($P_1$+$P_2$>0), $P_3$=0
else $P_3$=$P_1$+$P_2$ The output γ-correction part R7 performs γ-correction so that the reflection is linear during printing to the linear reflection signal $P_3$. Correction is performed through table conversion.

FIG. 26 is a block diagram of APPARATUS FOR ADJUSTING HUE, CHROMINANCE, AND LUMINANCE OF A VIDEO SIGNAL USING MATRIX CIRCUITS disclosed in U.S. Pat. No. 5,333,070 and referred to herein as "conventional example 2." In FIG. 26, Q1 denotes a Y/C separation circuit which separates a video signal into a brightness signal Y and a color signal C, Q2 denotes a decode circuit which converts the brightness signal Y and the color signal C into three primary colors R, G and B, Q3, Q4 and Q5 denote matrices of 3-row×3-column which perform color correction, Q6 denotes an A/D converter which performs analog/digital conversion of the color-corrected signal, Q7 denotes a frame memory which stores the digitized signal, Q8 denotes a ROM which performs γ-conversion, and Q9 denotes a head of a printer. Q10 is a regulation circuit which regulates the coefficient to the matrix circuit Q4.

The operation of the above-mentioned constitution is explained as follows. The operation of the matrix circuits Q3, Q4 and Q5 of 3-row×3-column which perform color correction is closely related to the present invention. The matrix circuit Q3 converts the input signal from the RGB coordinate system to an $S_{fy}$ coordinate system. The $S_{fy}$ coordinate system is a coordinate system which includes the skin color axis S, the green color axis f, and the brightness axis Y. When the matrix circuit Q3 is Mn, the matrix Mn on the skin color C1 and the green color C2 can be determined as indicated in the following formula.

$$\begin{pmatrix} 100 \\ 0 \\ Y_1 \end{pmatrix} = M_n \begin{pmatrix} R_1 \\ G_1 \\ B_1 \end{pmatrix} = M_n C_1$$

-continued $$\begin{pmatrix} 0 \\ 100 \\ Y_2 \end{pmatrix} = M_n \begin{pmatrix} R_2 \\ G_2 \\ B_2 \end{pmatrix} = M_n C_2$$

The matrix circuit Q4 performs the color regulation using $S_{fy}$ coordinate system, and outputs the signal expressed by the $S_{fy}$ coordinate system. When the matrix of the matrix circuit Q4 is Mh, Mh can be expressed as follows.

$$M_h = \begin{pmatrix} h_{11} & h_{12} & 0 \\ h_{21} & h_{22} & 0 \\ h_{31} & h_{32} & 1 \end{pmatrix}$$

The third row of the matrix Mh is (0 0 1) because the brightness of the achromatic signal is not changed. When the third row of the matrix Mh is (0 0 1), the role of each matrix element is as follows.

$h_{11}<1.0$ Decrease the saturation of $C_1$.
$h_{11}>1.0$ Increase the saturation of $C_1$.
$h_{21}<0$ $C_1$−hue in f-axis direction
$h_{21}>0$ $C_1$+hue in f-axis direction
$h_{31}<0$ Decrease the brightness of $C_1$.
$h_{31}>0$ Increase the brightness of $C_1$.
$h_{12}<0$ $C_2$−hue in S-axis direction
$h_{12}>0$ $C_2$+hue in S-axis direction
$h_{22}<1.0$ Decrease the saturation of $C_2$.
$h_{22}>1.0$ Increase the brightness of $C_1$.
$h_{32}<0$ Increase the brightness of $C_2$.
$h_{32}>0$ Increase the brightness of $C_2$.

Taking into consideration the above-mentioned role, the coefficients of the matrix Mh are determined according to the instruction of the regulation circuit Q10. The matrix circuit Q5 converts the input signal from the $S_{fy}$ coordinate system to the RGB coordinate system. The matrix used here is the inverse matrix of the matrix Mn. Color regulation by the matrix circuit is performed by successively performing the processes by the matrix circuits Q3, Q4, Q5.

In the above-mentioned method and device for color conversion according to conventional example 1, the pre-processing part R2 judges the magnitude of the input R, G and B signals, and outputs the region selection signal S in a fixed manner. The color conversion parameter memory part R3 outputs the parameter of the triangular prism corresponding to the region selection signal S, and the interpolation operating part R5 receives the parameter to perform interpolation. Thus, the conventional device has a disadvantage that highly accurate color correction can not be performed for the signal which must change the triangular prism to be processed though the magnitudes of the input R, G and B signals are same.

The color can not be accurately converted to the gradation of the R, G and B signals and their color mixture of yellow (Y), magenta (M), cyan (C) and gray (K) irrespective of the magnitude of the R, G and B signals. In addition, in conventional example 1, the input R, G and B signals are separated into the minimum signal L and the differential signals X, Y, and then, added to each other by the limit processing part R6. Thus, the over-flow and under-flow processing must be performed during the addition, resulting in the disadvantage that smooth change in gradation is lost depending on whether or not the processing is performed.

On the other hand, the above-mentioned color correction device in conventional example 2 uses the $S_{fy}$ coordinate system with a disadvantage that the third row of the matrix can only be used under the fixed condition. At the same time, in conventional example 2, when the brightness of the achromatic signal is changed, the third row of the matrix must be regulated, but no items related to its regulation are disclosed. Conventional example 2 has another disadvantage of doubling the processing load because the coordinate system is converted into another coordinate system, and finally returned to the original coordinate system. Moreover, in conventional example 2, color regulation is performed for the skin color $C_1$ and green color $C_2$, causing problems in regulating other colors.

The present invention solves the disadvantages related to the above-mentioned conventional examples, and provides a device and a method for color correction which is capable of separating the achromatic color and the chromatic color, and controlling each color independently.

The present invention also provides a device and a method for color correction which is capable of separating the chromatic color by the hue and gradation, and independently controlling each color.

The present invention further provides a color correction device which is capable of preparing an output table to be controlled, and rapidly performing the proceeding using the prepared output table.

The present invention furthermore provides a color correction application device which is capable of providing an environment for easily correcting and regulating the color by changing the output table.

SUMMARY OF THE INVENTION

The color correction device, according to the present invention, for changing and correcting an input signal to be inputted as image data from one signal coordinate system to another signal coordinate system includes: an input block judging means for judging the divided block of input space for the input signal system to which the input signal belongs; an input block internal position calculating means for obtaining the position in the divided block judged by the input block judging means at which the input signal is located; an output table referring means for obtaining the value of each apex of the block in the output space corresponding to the divided block judged by the input block judging means by referring to an output table; and an output signal generating means for generating an output signal using the value of each apex of the block of the output space obtained by the output table referring means and the internal position obtained by the input block internal position calculating means. The input block judging means constitutes the divided block where the input space is divided at division points of each locus of a plurality of chromatic colors present in a peripheral part of the achromatic region and the color region present in the center of the color region, and the gradation which is the level in the lightness direction is separated for each locus, and the block whose input signal is judged to be inside every plane of the divided block is selected as the divided block.

The output table referring means is characterized in that a table where the scan value of each color patch corresponding to the number of the locus division points numbered sequentially from black to white of each locus is the coordinate value of the input division point and the colorimetered value of each color patch is prepared as the coordinate value of the output division point is provided as the output table, and the color is regulated and controlled by changing and correcting either of the coordinate value of the input division point or the coordinate value of the output division point.

The input block judging means is characterized in that the block is divided so as to surely include the locus changing from black to white passing through the center part of the color region based on the chromatic color locus changing from black to white surrounding the color region and the achromatic color locus changing from black to white passing through the center part of the color region.

The input block judging means is also characterized in that the tetrahedron including the division points on the achromatic color locus changing from black to white passing through the center part of at least one color region is the divided block.

The input block judging means is characterized in that the color region is divided based on a plurality of chromatic color loci changing from black to white different in saturation level.

The input block judging means is characterized in that the color region is divided based on a plurality of chromatic color loci changing from black to white different in saturation level, and every block to divide the color region is a tetrahedron.

The input block judging means is characterized in that the color region is divided based on a plurality of chromatic color loci changing from black to white different in hue level.

The input block judging means is characterized in that the block is divided by a conical body with the input signal as the apex, and the input block internal position calculating means is characterized in that the internal position is set based on the volume of the conical body, and the internal position is obtained from the ratio of the volume of the divided block to the diagonal volume.

The output table referring means is characterized in that a first output table for converting the signal to be converted where the input division point coordinate value comprises the device value and the output division point coordinate value comprises the standard color space value into the signal of the standard color space, and a second output table for converting the signal converted to the standard color space value where the input division point coordinate value comprises the standard color space value and the output division point coordinate value comprises the device value into the signal of the device color space are provided as the output table, and the signal of a certain device can be converted into the signal of another device through the standardized color conversion using the first output table and through the individualized color conversion using the second output table.

Concerning the color correction device related to another invention, the color correction device for changing and correcting the input signal to be inputted as the image data from one signal coordinate system to the other signal coordinate system is characterized in that an input block judging means which divides the input space comprising the input signal system into the blocks comprising divided lattices with equal intervals for each component, divides each component of the input signal by the common divisor of each component, judges the divided block using the integer part of the quotient, and outputs the judged block number and the decimal part of the quotient, an output table referring means which is provided with an output table for rapid processing to store the coordinate value of each apex of the block of the output space corresponding to the block number, and obtains the coordinate value of each apex of the block of the output space corresponding to the block number judged by the input block judging means, and an output signal generating means which obtains the output signal using the decimal part of the quotient to be outputted from the input block judging means and the coordinate value to be outputted from the output table referring means are provided.

Concerning the color correction method of the present invention, the color correction method for changing and correcting the input signal to be inputted as the image data from one signal coordinate system to the other signal coordinate system is characterized in that an input block judging process to judge to which divided block to divide the input space comprising the input signal system the input signal belongs, an input block internal position calculating process to obtain at which position in the divided block judged by the input block judging process the input signal is located, an output table referring process to obtain the value of each apex of the block in the output space corresponding to the divided block judged by the input block judging process by referring to the output table, and an output signal generating process to generate the output signal using the value of each apex of the block of the output space obtained by the output table referring process and the internal position obtained by the input block internal position calculating process are provided, and the input block judging process constitutes the divided block where the input space is divided at division points of each locus of a plurality of chromatic colors present in a peripheral part of the achromatic region and the color region present in the center of the color region, and the gradation which is the level in the lightness direction is separated for each locus, and the block whose input signal is judged to be inside every plane of the divided block is selected as the divided block.

The output table referring process is characterized in that the color is regulated and controlled by changing and correcting either of the coordinate value of the input division point or the coordinate value of the output division point of an output table where the scan value of each color patch corresponding to the number of the locus division point numbered sequentially from black to white of each locus is the coordinate value of the input division point and the colorimetered value of each color patch is prepared as the coordinate value of the output division point.

The input block judging process is characterized in that the block is divided so as to surely include the locus changing from black to white passing through the center part of the color region based on the chromatic color locus changing from black to white surrounding the color region and the achromatic color locus changing from black to white passing through the center part of the color region.

The input block judging process is also characterized in that the tetrahedron including the division points on the achromatic color locus changing from black to white passing through the center part of at least one color region is the divided block.

The color correction application device is provided with an output table preparing device having a pre-regulation image indicating means for indicating the pre-regulation image, a table locus selecting means for selecting the locus of the achromatic color and the chromatic color of the image, a table division point selecting means for selecting the division points to be corrected and regulated among the division points of the locus selected by the table locus selecting means, an effect checking image indicating means for obtaining the color region affected by correction and regulation by obtaining the input coordinate value included inside a plurality of input blocks to which the locus selection value and the division point selection value to be selected by the table locus selecting means and the table division point selecting means, and for indicating the image part belonging to each locus of the color region, a table data editing means for editing the coordinate value of the input division point and the coordinate value of the output division point in the output table in which the scan value of each color patch corresponding to the number of the locus division points sequentially numbered from black to white of each locus on the color region is the coordinate value of the input division point and the colorimetered value of each color patch is the coordinate value of the output division point along the directions of lightness, saturation and hue corresponding to the loci of the achromatic color and the chromatic color of the image, a keeping means for keeping the output table corrected and regulated by the table data editing means, and a post-regulation image indicating means for converting the pre-regulation image using the output table corrected and regulated by the table data editing means and to indicate the post-regulation image, enabling preparation of the output table and correction and regulation of the color by changing the contents of the output table.

The color correction application device is also characterized in that the pre-regulation image indicating means and the post-regulation image indicating means are arranged on output devices with different output.

The color correction application device is further characterized in that the pre-regulation image indicating means and the post-regulation image indicating means are arranged on a plurality of output devices.

DETAILED DESCRIPTION

Embodiment 1

Figure 1:
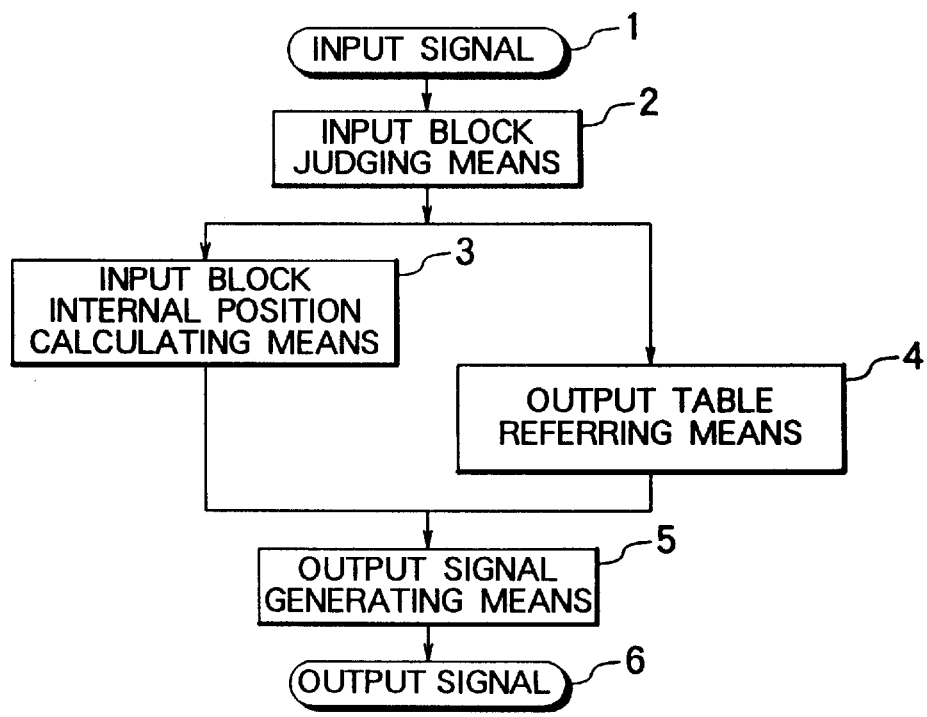
FIG. 1 is a block diagram illustrating embodiment 1 of the present invention.

Embodiment 1 of the present invention is explained with reference to the drawings. FIG. 1 is a block diagram illustrating the device and method for color correction according to embodiment 1 of the present invention.

In the figure, 1 denotes an input signal, which is a digitized image signal, such as R, G and B signals of a scanner, R, G and B signals of a monitor, R, G and B signals of CIE (Commission Internationale de l'Eclairage), X, Y and Z signals of CIE, L, a and b signals of CIE. Reference numeral 2 denotes an input block judging means for judging the block of divided space (an input space) for the input signal system to which the input signal 1 belongs, 3 denotes an input block internal position calculating means for obtaining the position in the block judged by the input block judging means 2 at which the input signal 1 is located.

Reference numeral 4 denotes an output table referring means for obtaining the value of each apex of the block of the output space corresponding to the block judged by the input block judging means 2 by referring to the output table, and 5 denotes an output signal generating means for generating the output signal 6 using the value of each apex of the block of the output space obtained by the output table referring means 4 and the internal position obtained by the input block internal position calculating means 3. An output signal 6 can be a digitized image signal depending on the contents of the output table, such as the R, G and B signals of the scanner, R, G and B signals of the monitor, C, M and Y signals of the printer, R, G and B signals of CIE, X, Y and Z signals of CIE, and L, a and b signals of CIE.

The color correction device according to embodiment 1, having the above-mentioned constitution, is explained in detail below, the input block judging means 2 being described first. Initially, the input block will be explained with reference to the illustration of the color space division indicated in FIG. 2.

Figure 2:
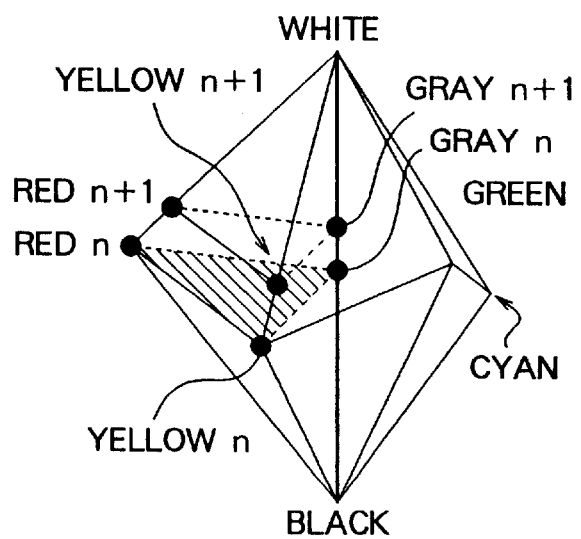
FIG. 2 is a conceptual view used to explain a divided condition of the color space in embodiment 1 of the present invention.

In general, no chromatic component (hue and gradation) is present in black through white even when the color is expressed by any space, and the color (red, green, blue, etc.) is distributed around the changing locus. In FIG. 2, a bold line indicates the changing locus, free from any chromatic component, in black through white. In the present invention, this locus is referred to as the achromatic locus. However, the locus is not necessarily a changing locus which is free from any chromatic component, and any locus is acceptable so long as it is a locus changing from black to white with colors distributed thereabouts. Various colors are distributed in the periphery, but the range of the color to be handled by the device is naturally limited when particular image equipment is assumed.

FIG. 2 expresses a three-dimensional body formed by connecting the outermost contour of every color to be handled, i.e., the color range. In this color range, a locus smoothly changing from black to white can be considered for every color. For example, the locus is considered where the color is progressively changed from black to slightly reddish black, more reddish black, then, changed from red with only red component to the direction of white, and changed into white through reddish white. FIG. 2 describes each locus for red, yellow, green and cyan. In the present invention, all loci are referred to as the chromatic loci. Similar to the achromatic locus, the chromatic locus is not necessarily true-reddish even in a case of the red locus, and any locus may be acceptable so long as it is the locus of the color of the similar chromatic component (hue in this case) located on the outermost contour of the color range.

FIG. 2 indicates the achromatic locus and a plurality of chromatic loci. Though each locus is continuous, in the present invention, each locus is divided into m sections (m≧2) so that the locus is expressed by (m+1) division points. In any locus, 0-th section denotes black, and m-th section denotes white. In an example in FIG. 2, red n and red n+1 denote two adjacent division points in the red locus.

In embodiment 1, a block for dividing the color space comprises six total division points including two adjacent division points of the achromatic locus, and adjacent division points for each of two adjacent chromatic loci on the hue. In FIG. 2, a pentahedron having apexes of (gray n, gray n+1, red n, red n+1, yellow n, and yellow n+1) indicates the divided block. In a case of n=0 and m−1, the divided block is a tetrahedron. In the present invention, gradation of each locus can be handled separately to express each locus at the division points.

Figure 3:
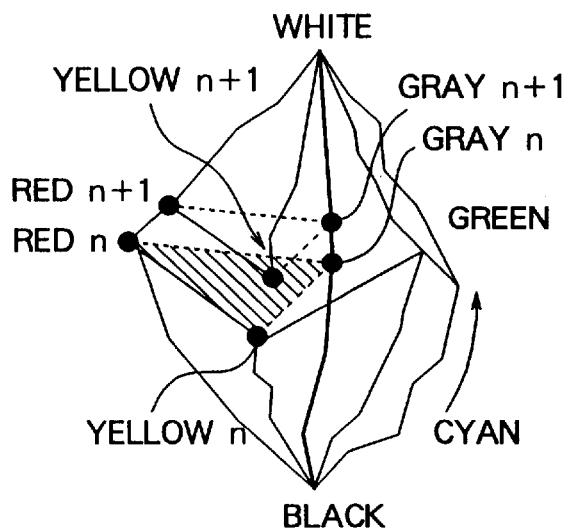
FIG. 3 is a conceptual view used to explain a color region of an actual image equipment in embodiment 1 of the present invention.

FIG. 3 indicates the color range, the achromatic locus and the chromatic locus of an actual image equipment. Similarly in this case, a block for dividing the color space comprises six total division points including two adjacent division points of the achromatic locus, and adjacent division points for each of two adjacent chromatic loci on the hue. Thus, a pentahedron having apexes of (gray n, gray n+1, red n, red n+1, yellow n, and yellow n+1) indicates the divided block.

Next, the input block judging function performed by the input block judging means 2 is explained with reference to the flow-chart of FIG. 4 and the illustration of FIG. 5. First, the divided block is selected (step 20 indicated in FIG. 4). As explained in FIG. 2 and FIG. 3, the color space is divided into a plurality of blocks. In the selection of the divided block (step 20 indicated in FIG. 4), the coordinate system of the input signal 1 is divided into a plurality of blocks, one of which is selected. In the selection of the plane comprising the block (step 21 indicated in FIG. 4), the plane of the divided block of a pentahedron or a tetrahedron is selected.

Figure 4:
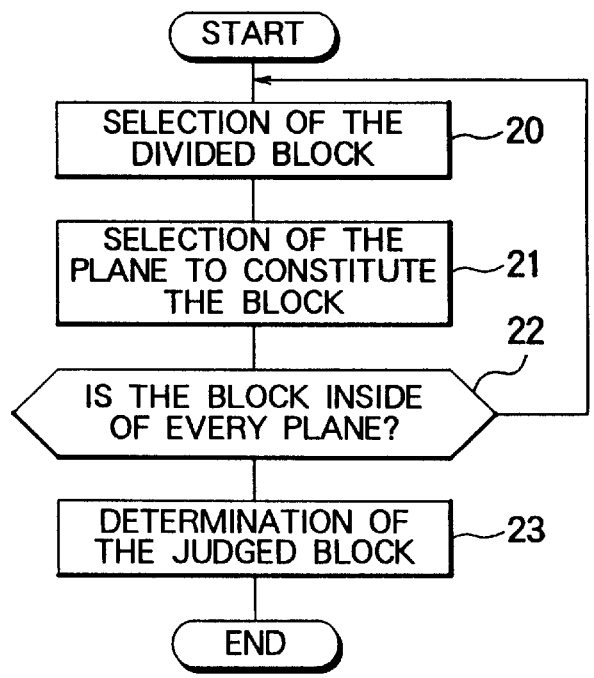
FIG. 4 is a flow-chart illustrating operation of the input block judging means in embodiment 1 of the present invention.
Figure 5:
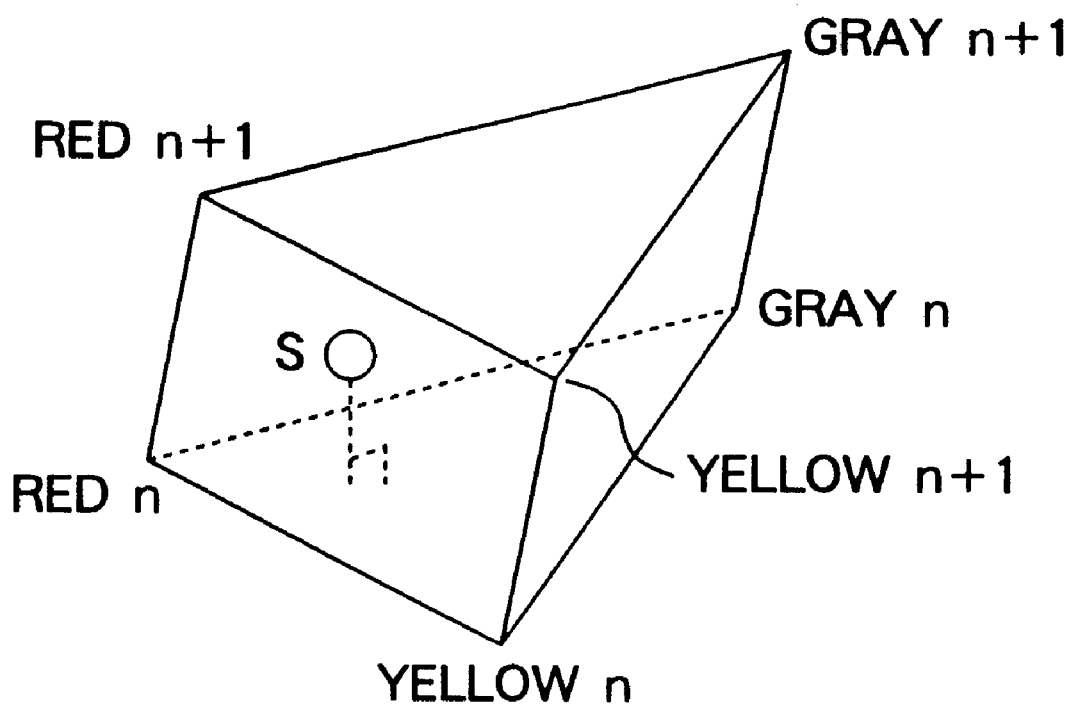
FIG. 5 is a schematic view used to explain the block judgment in embodiment 1 of the present invention.

Next, judgment is made as to whether or not the input signal is inside every plane (step 22 indicated in FIG. 4). FIG. 5 is a drawing which will be used to explain this judging method. In FIG. 5, judgment is made as to whether the input signal S is located inside or outside the three-dimensional body relative to the plane (red n, yellow n, and gray n) comprising the pentahedron, where the input signal 1 is S (hereinafter, the input signal 1 indicates the same signal as the input signal S). This can be determined by the positive/negative sign of the volume of the three-dimensional body comprising the plane (red n, yellow n, and gray n) and the input signal S. This operation is performed for every plane of the selected divided block to judge whether the input signal S is located inside.

When it is judged that the input signal is not inside, the process returns to the divided block selection (step 20 indicated in FIG. 4), to thereby select the next block to perform the same function. When it is judged that the input signal is inside, the process advances to the judged block selection (step 23 indicated in FIG. 4). The judged block is the divided block containing the input signal S, and the divided block number is set as the judged block number.

Next, the input block internal position calculating means 3 will be explained. First, the definition of lightness, hue and saturation used in the present invention is explained with reference to FIGS. 6A–6C. Though lightness, hue and saturation are defined in the color engineering aspect, the terms are defined in relation to the block to divide the color space in the present invention.

Figure 6A:
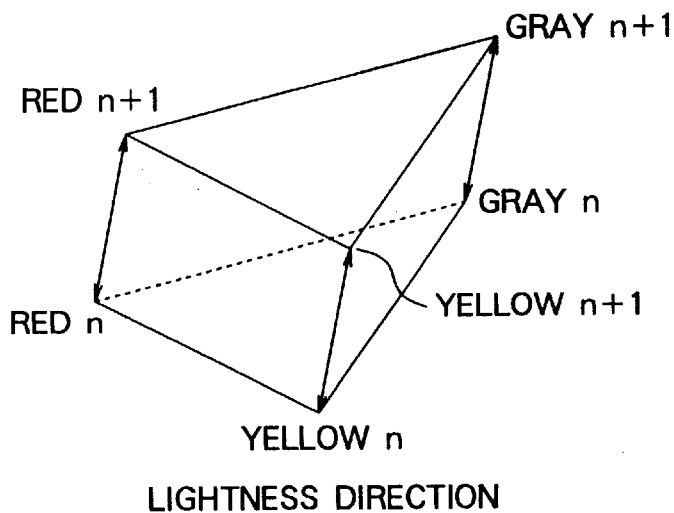
FIGS. 6A–6C are schematic views used to explain the definition of lightness, hue and saturation in embodiment 1 of the present invention.
Figure 6B:
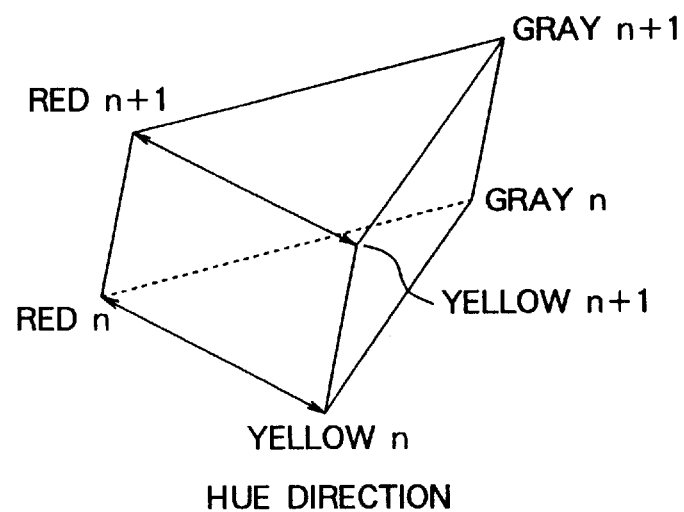
Figure 6C:
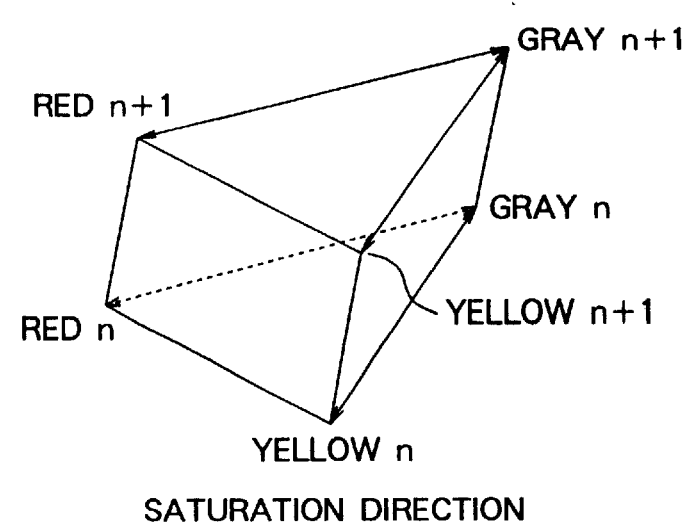

The lightness direction is defined as the direction of (red n–red n+1), (yellow n–yellow n+1), and (gray n–gray n+1) as indicated in FIG. 6A. The hue direction is defined as the direction of (red n–yellow n), and (red n+1–yellow n+1) as indicated in FIG. 6B. The saturation direction is defined as the direction of (gray n–red n), (gray n–yellow n), (gray n+1–red n+1), and (gray n+1–yellow n+1) as indicated in FIG. 6C. Other blocks are similarly defined.

These definitions are appropriate in scanning the color space without any clearance though they are different from general definitions. This is because yellow n and yellow n+1 are different in lightness, hue and saturation in the general definition. Thus, in the image equipment designed so that the color is changed from yellow n to yellow n+1, the lightness, hue and saturation in the general definition must be handled simultaneously to trace the change in color from yellow n to yellow n+1, but only the lightness direction may be handled in the definition of lightness, hue and saturation in the present invention. The same effect is expected in the hue direction and the saturation direction. The definition in the present invention is thus appropriate for the characteristics of realistic image equipment.

Figure 7:
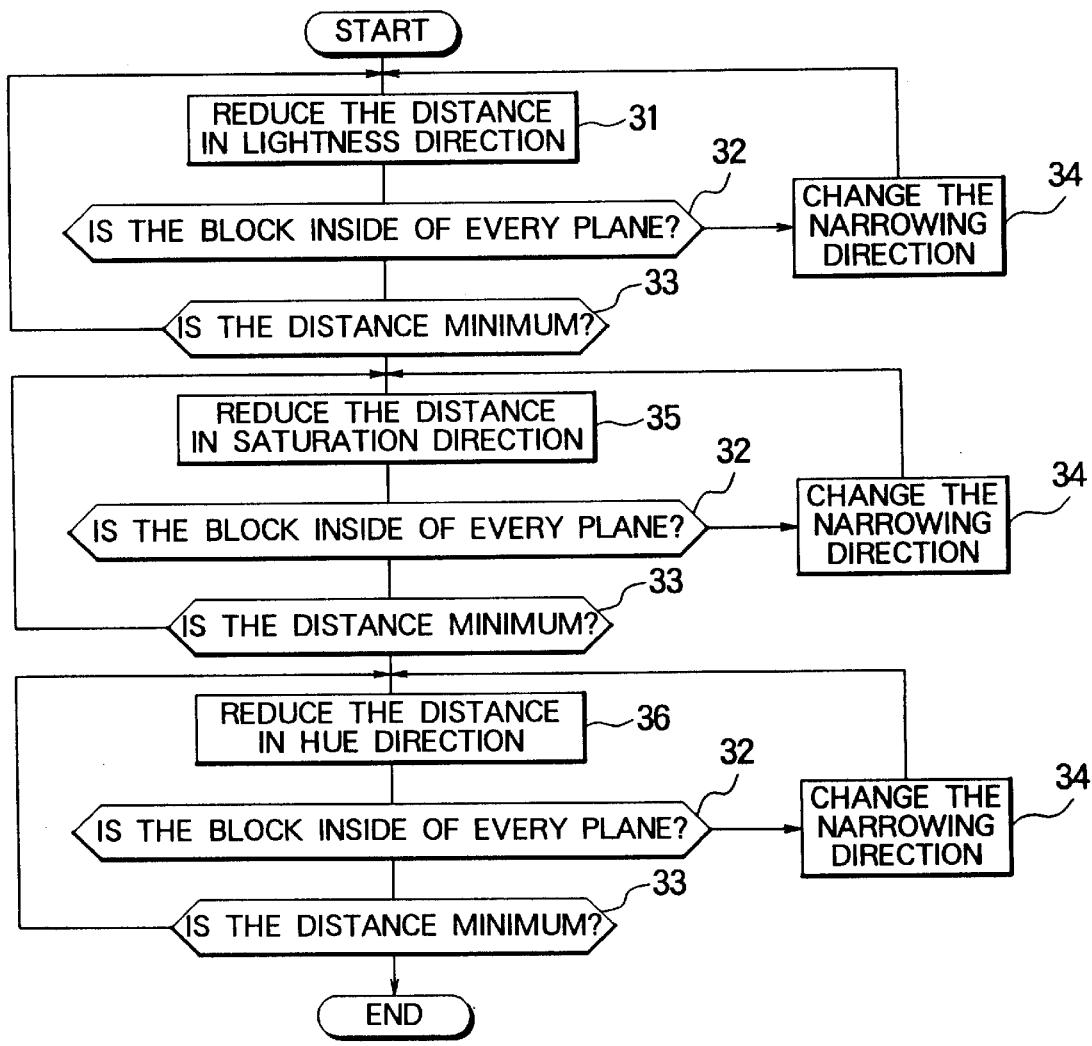
FIG. 7 is a flow-chart illustrating the procedure for judging the internal position in embodiment 1 of the present invention.
Figure 8:
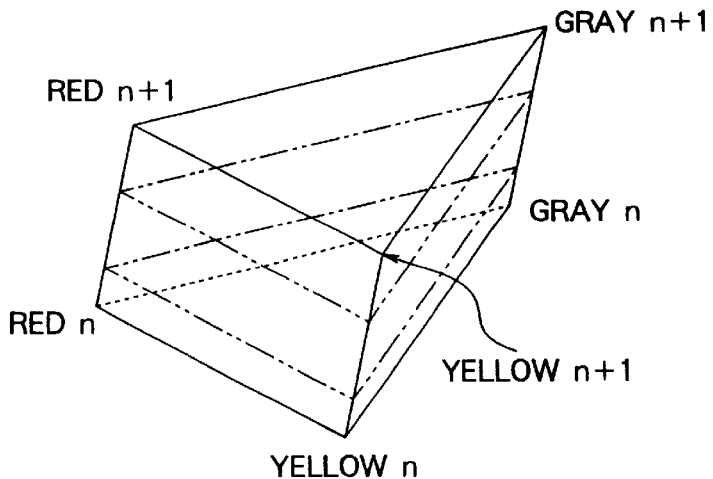
FIG. 8 is a schematic view used to explain the judgment of the internal position in embodiment 1 of the present invention.

Judgment of the internal position by the input block internal position judging means 3 is described by referring to the flow-chart of FIG. 7 and the illustration of FIG. 8. First, internal position setting in the lightness direction is performed as follows.

The distance in the lightness direction is reduced (step 31 indicated in FIG. 7), thereby reducing the volume of the block by reducing the distance in the lightness direction as indicated in FIG. 8. FIG. 8 indicates the pentahedron in which the pentahedron surrounded by the two-dot chain line is narrowed. Then, judgment is made whether or not the input signal S is inside every plane (step 32 indicated in FIG. 7). This is the judgment of whether the input signal S is inside the block relative to every plane of the pentahedron narrowed in the lightness direction as indicated in FIG. 8. Judgment is made in accordance with the judgment whether the input signal is inside every plane by the input block judging means 2 (step 22 indicated in FIG. 2).

When it is judged that no input signal is inside relative to every plane, the process advances to the narrowing direction changing process (step 34 indicated in FIG. 7). The direction to narrow the lightness direction is changed here. Then, the process returns to the process to reduce the distance in the lightness direction (step 31 indicated in FIG. 7).

When it is judged that the input signal is inside relative to every plane, the procedure advances to the judgment process as to whether or not the distance is minimum (step 33 indicated in FIG. 7). Here, judgment is made as to whether or not the distance in the narrowed lightness direction is not more than the prescribed minimum value. When the distance is not a minimum, the procedure returns to the process to reduce the distance in the lightness direction in (step 31), and the distance is further reduced to repeat the same operation. When the distance is judged to be the minimum value or less, the position of the minimum distance in the lightness direction is relatively obtained, and the obtained value is set to be the internal position in the lightness direction. Then, setting the internal position in the saturation direction is initiated.

The operation is performed similarly to the internal position setting operation in the lightness direction. What is different is the process to reduce the distance in the saturation direction (step 35 indicated in FIG. 7). This is the operation to reduce the distance in the direction of (gray n–red n), (gray n–yellow n), (gray n+1–red n+1) and (gray n+1–yellow n+1) which is the saturation direction as explained in FIG. 8. When the distance is judged to be minimum or less in the judgment process as to whether or not the distance is minimum (step 33 indicated in FIG. 7), the position of the minimum distance in the saturation direction is relatively obtained, and the obtained value is set as the internal position in the saturation direction. Then, setting the internal position in the hue direction is initiated.

The operation is performed similarly to the setting work of the internal position in the lightness direction. What is different is the process to reduce the distance in the hue direction (step 35 indicated in FIG. 7). This is the operation to reduce the distance in the direction of (red n–yellow n), and (red n+1–yellow n+1) which is the hue direction as explained in FIG. 8. When the distance is judged to be minimum or less in the judgment process whether or not the distance is minimum (step 33), the position of the minimum distance in the hue direction is relatively obtained, and the obtained value is set as the internal position in the hue direction.

Figures 9, 10:
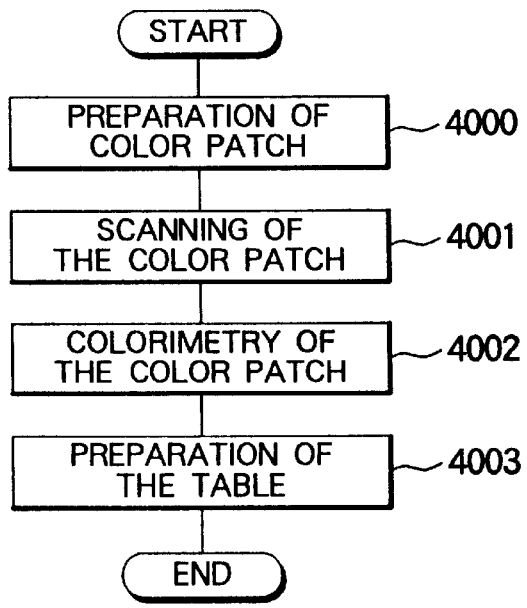
FIG. 9 is a mode view of the output table in embodiment 1 of the present invention.
FIG. 10 is a flowchart illustrating the procedure for preparing the output table in embodiment 1 of the present invention.

The output table referring means 4 indicated in FIG. 1 is next explained, after the method to obtain the output table is explained. FIG. 9 illustrates the mode of the output table to be handled in the present invention. In FIG. 9, the division points number of the locus is the number allotted to the achromatic locus and the chromatic locus indicated in FIG. 2 and FIG. 3, and the number of the division points for each locus is the same. The coordinate value of the input division points is the value to express the color of the division points number of the locus by the coordinate system of the input signal 1, and the coordinate value of the output division points is the value of the color of the division points number of the locus by the coordinate system of the output signal 6. The coordinate value of the input division points and the coordinate value of the output division points can be expressed by at least three color components, and in the illustration of FIG. 8, the coordinate values are expressed by three components, and may be expressed by more components.

As indicated in FIG. 9, the output table is the coordinate value of the input division points combined with the coordinate value of the output division points corresponding thereto for each division point of the locus. The coordinate value of the input division points is used by the input block judging means 2 and the input block internal position calculating means 3, while the coordinate value of the output division points is used by the output table referring means 4.

The output table is prepared according to the procedure indicated in FIG. 10. FIG. 10 illustrates, for example, a procedure for preparing the output table of the scanner. First, the color patch preparation process (step 4000 indicated in FIG. 10) is performed. This process prepares the color patch along the locus which is smoothly changed from black to white. For example, the color patch is prepared where the color is changed progressively from black to slightly reddish black, and to more reddish black, to red with only red component, and then, in the direction of white progressively, and changed to white through reddish white. This is the color patch of the red locus, and in addition, the color patches are prepared for the green, blue, yellow, magenta, and cyan loci and the achromatic color (gray) locus.

Next, the scanning process of the color patch (step 4001 indicated in FIG. 10) is performed. This operation is to scan each prepared color patch by the scanner and to obtain the scan signal. The scan signal is generally the R, G and B signals. Then, the color patch is colorimetered (step 4002 indicated in FIG. 10). This operation is to calorimeter the prepared color patch by the calorimeter. The colorimetered values are ones in the X, Y and Z coordinate system and the L, a and b coordinate system.

The table preparation process (step 4003 indicated in FIG. 10) is performed based on the data obtained in the above-mentioned procedures. The table is prepared with the scanned value of each color patch as the coordinate value of the input division points and the colorimetered value as the coordinate value of the output division points. The division points of the locus are sequentially numbered from black to white in each locus. The output table in the reverse relationship can be obtained by preparing the table with the colorimetered value of each color patch as the coordinate value of the input division points and the scanned value as the coordinate value of the output division points.

When the color is regulated and controlled, it can be achieved by changing and correcting the output table prepared in the above-mentioned manner or the existing output table. For example, when the block to generate the output signal is switched by changing the input block, the coordinate value of the input division points corresponding to the input block to be regulated and controlled is changed and corrected. This includes the case where the block which has been handled as the red block signal is handled as the yellow block. In this case, the existing red block signal is handled as the yellow block, and the signal is handled as the yellow block signal in the output generating means 5.

When the input block is not changed, but only the output signal is changed, the coordinate value of the output division points corresponding to the input block to be regulated and controlled is changed and corrected. This includes the case where the signal is handled as the red block signal but the output signal is changed into yellow. The existing red block signal is handled as the red block without any change, but the output table to be referred to is changed into yellow. As mentioned above, the color can be regulated and controlled by changing and correcting the output table.

Figure 11:
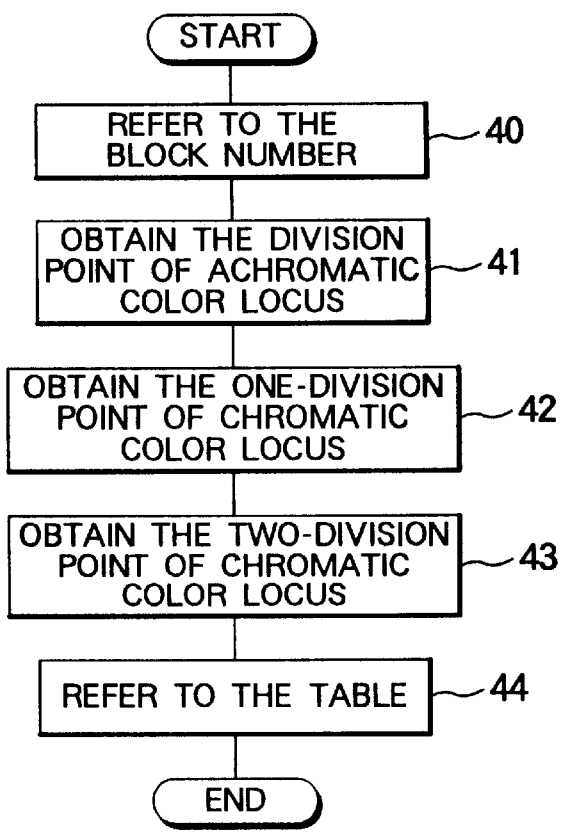
FIG. 11 is a flow-chart illustrating the procedure of the output table referring means in embodiment 1 of the present invention.

The operation of the output table referring means 4 to obtain the value of each apex of the output space corresponding to the block judged by the input block judging means 2 by referring to the output table prepared in the above-mentioned manner is described in detail by referring to the flow-chart of FIG. 11. First, the block number referring process (step 40 indicated in FIG. 11) is performed. The block number judged by the input block judging means 2 is referred to here. Second, the process for obtaining the division points of the achromatic locus (step 41 indicated in FIG. 11) and the process for obtaining the division points of the chromatic locus (step 42 indicated in FIG. 11), and the process for obtaining the division points of two chromatic loci (step 43 indicated in FIG. 11) are performed. This operation obtains the division points of each apex comprising the block based on the referred block number. More specifically, the operation is to obtain gray n and gray n+1 as the division points of the achromatic locus, red n and red n+1 as one division point of the chromatic locus, and yellow n and yellow n+1 as the two division points of the chromatic locus respectively in the judgment block, described for example in FIG. 5.

Finally, the table referring process (step 44 indicated in FIG. 11) is performed. The coordinate value of the output division points of the division points required by the below-mentioned output signal generating means 5 is referred to based on the above-mentioned output table. The referred value is set as the value in the output coordinate system of the apex comprising the divided block containing the input signal 1.

The internal position obtained by the input block internal position calculating means 3 is defined as follows.

Figure 12:
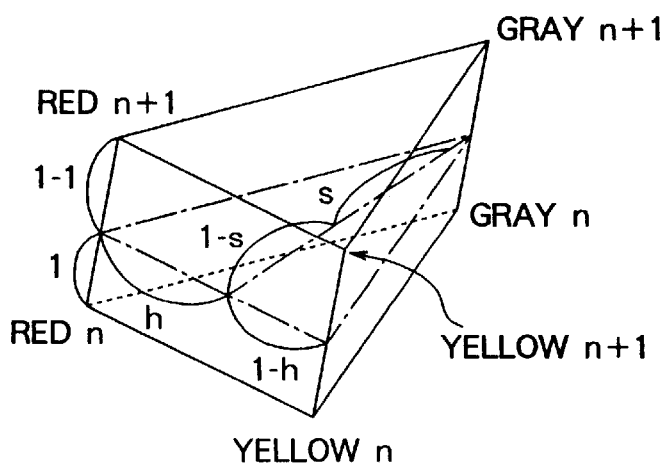
FIG. 12 is a schematic view used to demonstrate the relationship between the internal position and the divided block in embodiment 1 of the present invention.

Internal position in the lightness direction: l
Internal position in the saturation direction: s
Internal position in the hue direction: h The relationship of the internal position and the divided block is indicated in FIG. 12. When the coordinate values of the output division points of six apexes obtained by the output table referring means 4 are $Bk_n$, $Bk_{n+1}$, $Y_n$, $Y_{n+1}$, $R_n$, $R_{m+1}$ (m=0~n) (where, Bk denotes gray, Y denotes yellow and R denotes red), the output signal 0 can be obtained by the following formula where the output signal 6 to be outputted from the output signal generating means 5 is expressed as 0.

$$0 = (1-s)[l \times Bk_{n+1} + (1-l) \times Bk_n] +$$
$$s\{h[l \times Y_{n+1}(1-l) \times Y_n] + (1-h)[l \times R_{n+1} + (1-l) \times R_n]\}$$

As mentioned above, in embodiment 1, the color can be separated and handled for each block because the color space of the input signal 1 is divided into a plurality of blocks where the achromatic color present in the center of the color region, a plurality of chromatic colors present in the periphery of the color region, and gradation which is the level in their lightness direction are separated.

The table which is prepared with the scanned value of each color patch corresponding to the division points number of the locus sequentially numbered from black to white of each locus as the coordinate value of the input division points and with the colorimetered value of each color patch as the coordinate value of the output division points is provided as the output table, and the color can be easily regulated and controlled by changing and correcting either of the coordinate value of the input division points or the coordinate value of the output division points.

In addition, the color space of the input signal 1 is divided into the blocks which surely contain the locus changing from black to white passing through the center part based on the locus (chromatic locus) changing from black to white surrounding the color region capable of handling the input image equipment and the locus (achromatic locus) changing from black to white passing through the center part of the color region capable of handling the input image equipment, and the color can be interpolated along the locus of the color change of the input signal 1. Because the above-mentioned blocks are those around the locus changing from black to white passing through the center part, the achromatic part present in the center of the color space can be separated from the chromatic part present in the periphery thereof. In addition, each locus is expressed by the division points and gradation of each locus can be separated from each other.

Embodiment 2

Embodiment 2 is next described. As indicated in FIG. 2 and FIG. 3, the input block in embodiment 1 is the block to divide the color space at six total division points of two adjacent division points of the achromatic locus, and two adjacent division points for each of two chromatic loci on the hue. In embodiment 2, however, the input block is a tetrahedron of one of two types:

a) a tetrahedron comprising one division point on the achromatic locus, two adjacent division points on the chromatic locus, and one division point on the chromatic locus adjacent to said chromatic locus on the hue;

b) a tetrahedron comprising two division points on the achromatic locus, two adjacent division points on the chromatic locus, and one division point on the chromatic locus adjacent on the hue.

Figure 13:
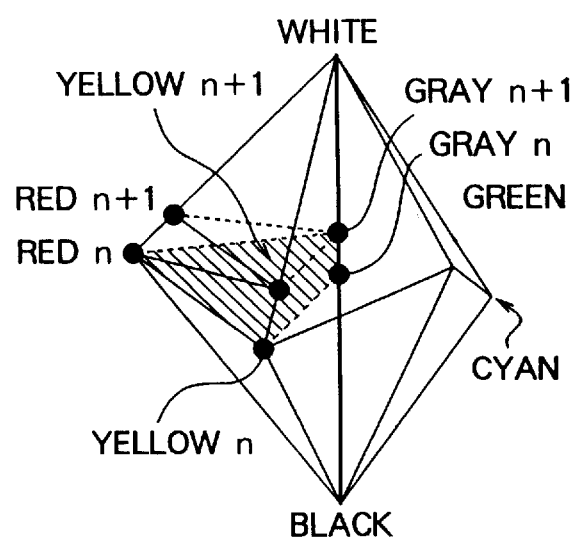
FIG. 13 is a conceptual view of the input block in embodiment 2 of the present invention.

FIG. 13 is the conceptual view of the input block in embodiment 2. In FIG. 13, the tetrahedron of type a) is (gray n+1, red n, red n+1, yellow n+1), and (gray n+1, red n, yellow n, yellow n+1), while the tetrahedron of type b) is (gray n, gray n+1, red n, yellow n).

The constitution of the color correction device according to embodiment 2 is basically similar to that of embodiment 1 as indicated in FIG. 1. The difference is that the tetrahedron containing the division points on the locus (the achromatic locus) changing from black to white passing through the center part of at least one color region is the divided block by the input block judging means 2 related to embodiment 2, and the input block internal position calculating means 3, the output table referring means 4, and the output signal generating means 5 perform similar processes to those of embodiment 1.

Thus, in embodiment 2, the block is the tetrahedron containing the division points on the locus (the achromatic locus) changing from black to white passing through the center part of at least one color region, and every process can be equally handled, and the process is thereby simplified.

Embodiment 3

Embodiment 3 is next described. The input block in embodiment 1 is the block to divide the color space at six total division points of two adjacent division points of the achromatic locus, and two adjacent division points for each of two chromatic loci on the hue. In the embodiment 3, however, the locus of the color lower in the saturation level than the chromatic locus of embodiment 1 is added so that the locus from the achromatic color to the chromatic color can be obtained more correctly.

Figure 14:
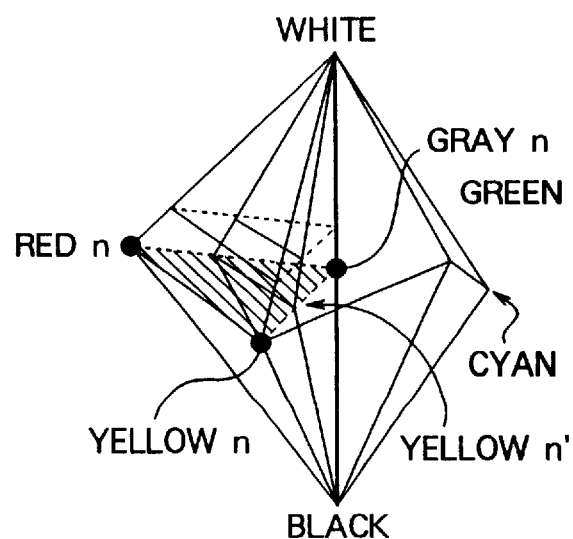
FIG. 14 is a conceptual view of the input block in embodiment 3 of the present invention.

FIG. 14 is a conceptual view of the input block in the embodiment 3. The added locus is the locus from black to white through yellow n'. This is equivalent to that the locus from gray n to yellow n through yellow n' is added as the locus in the saturation direction. The input block is a hexahedron, a pentahedron, and a tetrahedron with the division points of each locus as the apex.

That means, the constitution of the color correction device according to embodiment 3 is basically similar to that of embodiment 1 indicated in FIG. 1. The difference is that the color region is divided based on a plurality of loci (chromatic loci) changing from black to white different in saturation level by the input block judging means 2 related to the embodiment 3, and the input block internal position calculating means 3, the output table referring means 4 and the output signal generating means 5 perform similar process to that of embodiment 1.

As mentioned above, in embodiment 3, a plurality of loci (chromatic loci) changing from black to white different in saturation level are prepared, the number of loci in the intermediate parts between the achromatic part located in the center part and the chromatic part located in the peripheral part is increased so that the locus from the achromatic color to the chromatic color can be obtained more correctly.

Embodiment 4

Embodiment 4 is next described. In the above-mentioned embodiment 2, the input block is the tetrahedron containing the division points on at least one achromatic locus, while in embodiment 3, a plurality of chromatic loci different in saturation level are prepared, and the input color space is divided by the hexahedron, the pentahedron and the tetrahedron.

That means, in embodiment 4, embodiment 2 is combined with embodiment 3, and a plurality of chromatic loci different in saturation level are prepared, and the tetrahedron with four division points of the locus as the apexes is the input block.

The constitution of the color correction device according to embodiment 4 is basically similar to that of the embodiment 1 indicated in FIG. 1. The difference is that the color region is divided based on a plurality of loci (chromatic loci) changing from black to white and having different saturation levels by the input block judging means 2 related to the embodiment 4, and every input block is the tetrahedron, and the input block internal position calculating means 3, the output table referring means 4 and the output signal generating means 5 perform similar processes to those of embodiment 1.

As mentioned above, in embodiment 4, a plurality of loci (chromatic loci) changing from black to white different in saturation level are prepared, and every input block is the tetrahedron, every process can be handled equally, the processes are simplified, and the number of loci in the intermediate parts between the achromatic part located in the center part and the chromatic part located in the peripheral part is increased so that the locus from the achromatic color to the chromatic color can be obtained more accurately.

Embodiment 5.

Embodiment 5 is next described. As indicated in FIG. 2 and FIG. 3, the input block in embodiment 1 is the block to divide the color space at six total division points of two adjacent division points of the achromatic locus, and two adjacent division points for each of two chromatic loci on the hue. In embodiment 5, however, the locus located between the chromatic loci of the embodiment 1 is added so that the locus from one chromatic color to another chromatic color can be obtained more accurately.

Figure 15:
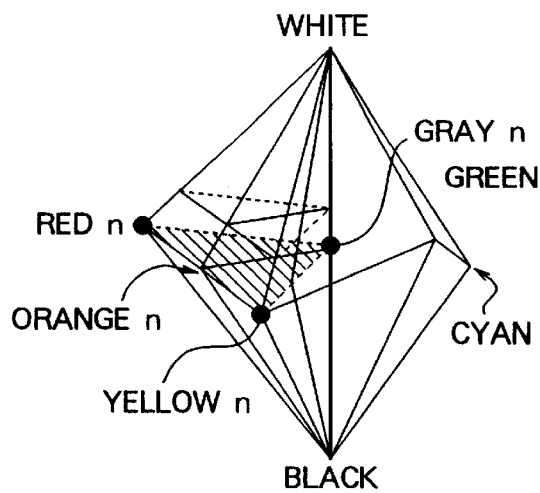
FIG. 15 is a conceptual view of the input block in embodiment 5 of the present invention.

FIG. 15 is a conceptual view of the input block in embodiment 5. The added locus is the locus from black to white through orange n. This is equivalent to that the locus from yellow n to red n through orange n is added as the locus in the hue direction. The input block is the pentahedron or the tetrahedron with the division points of each locus as the apexes.

The constitution of the color correction device according to embodiment 5 is basically similar to that of embodiment 1 indicated in FIG. 1. The difference is that the color region is divided based on a plurality of loci (chromatic loci) changing from black to white different in saturation level by the input block judging means 2 related to the embodiment 5, and the input block internal position calculating means 3, the output table referring means 4 and the output signal generating means 5 perform similar processes to those of embodiment 1.

As mentioned above, in embodiment 5, a plurality of loci (chromatic loci) changing from black to white different in saturation level are prepared, and the number of loci of the chromatic part located in the peripheral part is increased so that the locus from one chromatic color to another chromatic color can be obtained more correctly.

Embodiment 6

Embodiment 6 is next described. The input block internal position calculating means 3 of embodiment 1 calculates the divided block in which the input signal 1 is located by reducing the distance in the lightness, hue and saturation directions as indicated in FIG. 7, while, in embodiment 6, the judgment block is divided by the conical body with the input signal 1 as the apex, and the internal position is set based on the volume of the conical body. Thus, the calculation formula of the output signal generating means 5 is changed.

Figure 16:
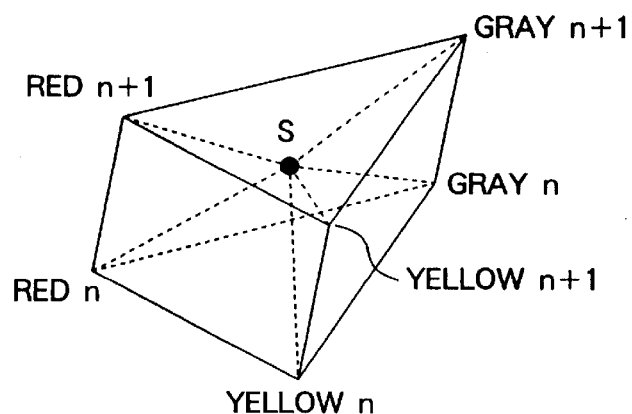
FIG. 16 is a schematic view used to explain the judging block division in embodiment 6 of the present invention.

Embodiment 6 is explained in detail with reference to FIG. 16. As indicated in FIG. 16, the input block judging means 2 divides the judgment block into five conical bodies with the input signal 1 (symbol S) as the apex. The input block internal position calculating means 3 sets the internal position based on the volume of the conical bodies, and the internal position is obtained from the ratio of the volume of the divided block to the diagonal volume. That means, the volume of each conical body is obtained, and then, two conical bodies containing no line section connecting the input signal 1 to the concerned apex of the judgment block are obtained for each apex of the judgment block. For example, the conical bodies to be selected for the apex (red n) are the conical body (S–red n+1, yellow n+1, gray n+1) and the conical body (S–yellow n, yellow n+1, gray n+1, gray n). Then, the volume of two conical bodies selected for each apex is added thereto. This is referred to as the diagonal volume for each apex, and expressed by the symbols V (red n), V (yellow n), . . .

The internal position is obtained based on the following formula where the internal position is expressed by the symbols P (red n) and P (yellow n), and the volume of the judgment block is V (judgment block).

$$P(\text{red } n) = V(\text{red } n)/(2 \times V(\text{judgment block}))$$

$$P(\text{yellow } n) = V(\text{yellow } n)/(2 \times V(\text{judgment block}))$$

The output signal 6 is expressed as 0, and obtained by the following formula. The formula means the internal interpolation with the volumetric ratio. Bkn, Bkn+1, Yn, Yn+1, Rn, and Rn+1 are the coordinate values of the output division point corresponding to each apex of the selected block.

$$0 = Bkn \times P(\text{gray } n) + Bkn+1 \times P(\text{gray } n+1) + Yn \times P(\text{yellow } n) +$$
$$Yn+1 \times P(\text{yellow } n+1) + Rn \times P(\text{red } n) + Rn+1 \times P(\text{red } n+1)$$

As mentioned above, in embodiment 6, the judgment block is divided by the conical bodies with the input signal 1 as the apex, and the internal position is set based on the volume of the conical bodies, and the internal position is obtained from the ratio of the volume of the judgment block to the diagonal volume, and the output signal 6 can be easily obtained using the coordinate value of the output division point corresponding to each apex of the polygon.

Embodiment 7

Embodiment 7 is next described. In embodiment 1, it is indicated that the output table is prepared by the procedure shown in FIG. 10, and in embodiment 7, the procedure for preparing the output table on the image output device such as a monitor or a printer.

Figure 17:
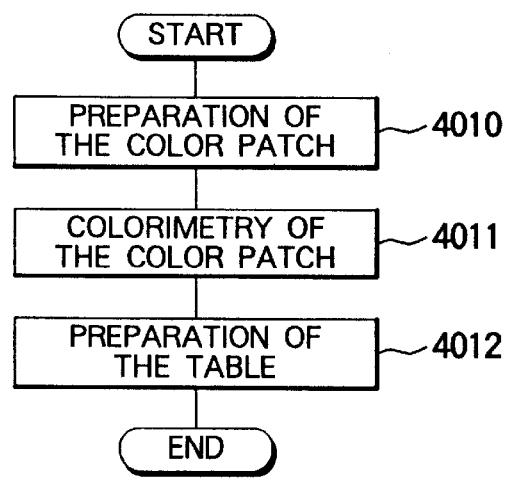
FIG. 17 is a flow-chart illustrating the procedure for preparing the output table on the image output device in embodiment 7 of the present invention.

FIG. 17 indicates the procedure for preparing the output table on the image output device. In preparing the color patch (step 4010 indicated in FIG. 17), the color patch data to be displayed on the monitor or to be printed by the printer is prepared. The data to be prepared is the data for the achromatic locus and the data for the chromatic locus changing from black to white in a plurality of stages. Then, the colorimetry of the color patch (step 4011 indicated in FIG. 17) is performed. The color to be displayed on the monitor or printed by the printer is colorimetered using the prepared color patch data. Finally, the table is prepared (step 4012 indicated in FIG. 17). The table is prepared with the data value of each prepared color patch as the coordinate value of the input division points and the coordinate value of the output division points. The locus division points are sequentially numbered from black to white of each locus. The output table of the reverse relationship is obtained if the table is prepared with the colorimetered value of each color patch as the coordinate value of the input division points and the data value of each prepared color patch as the coordinate value of the output division points.

As mentioned above, in embodiment 7, the table on the image output device is obtained because the table on the image output device is prepared, enabling the color correction including the image output equipment.

Embodiment 8

Embodiment 8 is next described. Embodiment 8 is an example of converting the image signal of a certain device (scanner and monitor) into the image signal of other devices (monitor and printer).

As for the constitution of the color correction device related to embodiment 8, in the constitution of embodiment 1 indicated in FIG. 1, the first output table to convert the converted signal in which the coordinate value of the input division point is constituted by the device value, and the coordinate value of the output division point is constituted by the standard color space value into the signal of the standard color space, and the second output table to convert the signal converted into the standard color space in which the coordinate value of the input division point is constituted by the standard color space value and the coordinate value of the output division point is constituted by the device value are provided as the output table to be referred to by the output table referring means 4, and the signal of a certain device can be converted in the signal of the other device through conversion of the standardized color using the first output table and through the conversion of the individualized color using the second output table.

Figure 18:
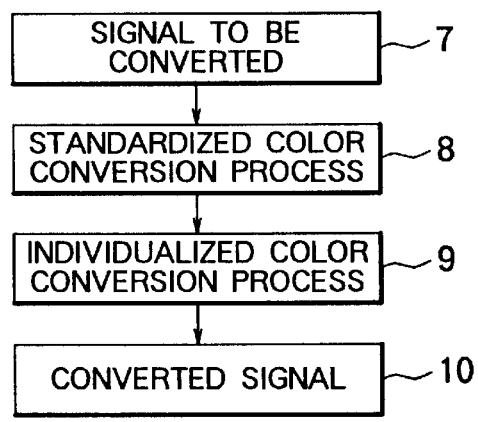
FIG. 18 is a block diagram illustrating embodiment 8 of the present invention.

FIG. 18 indicates the block diagram for embodiment 8. In the diagram, 7 denotes the signal to be converted, for example, RGB signal of the scanner and the RGB signal of the monitor. Reference numeral 8 denotes the standardized color conversion process to convert the converted signal 7 into the signal of the standard color space. The standard color space means the XYZ color space and the Lab color space of CIE. Reference numeral 9 denotes the individualized color conversion process for converting the signal converted by the standardized color conversion process 8 into the signal of the device color space. The device color space means the space to be constituted by the signal of the device to handle the image. The device color space is generally the RGB signal space for the scanner, the RGB signal space for the monitor, and RGB signal space or CMY (K) signal space for the printer. Reference numeral 10 denotes the signal converted by the individualized color conversion process 9.

The standardized color conversion process 8 and the individualized color conversion process 9 are explained in detail below. The output table to be prepared by the standardized color conversion process 8 is the table in which the coordinate value of the input division points is constituted by the device value and the coordinate value of the output division points is constituted by the standard color space value. The converted signal 7 is converted into the signal of the standard color space in accordance with the process indicated in the embodiment 1 using the output table. The output table to be prepared by the individualized color conversion process 9 is the table in which the coordinate value of the input division points is constituted by the standard color space value and the coordinate value of the output division points is constituted by the device value. The signal of the standard color space is converted into the converting signal 10 in accordance with the process indicated in embodiment 1 using the output table.

In embodiment 8, the process indicated in embodiment 1 is performed twice, and thus, the image signal of a certain device (scanner and monitor) can be converted into the image signal of the other device (monitor and printer), and the color control of the system comprising various image equipment can be performed.

Embodiment 9

Embodiment 9 is next described. Embodiment 9 is an example for rapidly performing the process described in embodiment 1. Prior to the explanation of the rapid processing, the procedure for preparing the output table for rapid processing is explained.

The output table for rapid processing is the output table described in FIG. 9 converted into the lattice-shaped table. To begin with, the common divisor is obtained for each component of the input signal of the output table. For example, if the input signal is the RGB signal and the signal of the space of each 8-bit, the common divisor is 15 or 17. Then, the input signal space is divided by each common divisor to form the lattice divided with equal intervals for each component. The divided block becomes parallelopiped in the input signal space. Then, the output signal 6 is obtained in the process indicated in embodiment 1 with the coordinate value of every lattice point as the input signal 1, and the output table for rapid processing comprising the input signal 1 and the corresponding output signal 6 is prepared.

Figure 19:
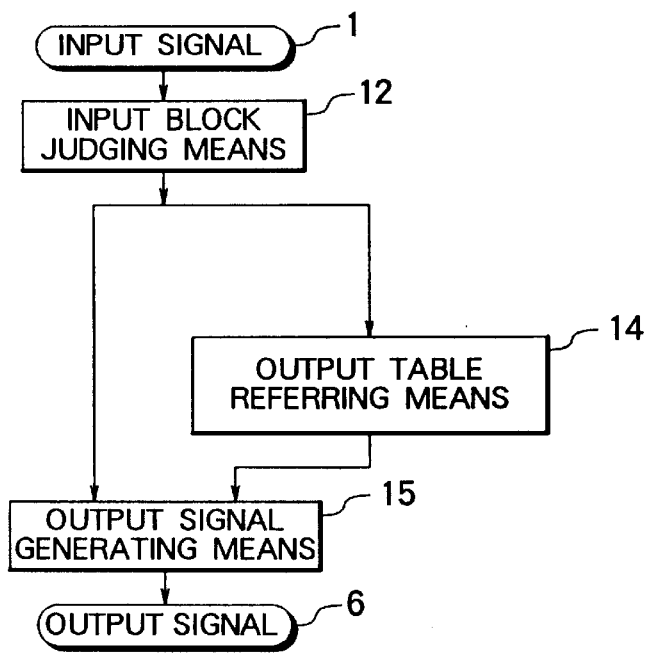
FIG. 19 is a block diagram illustrating embodiment 9 of the present invention.

FIG. 19 is the block diagram illustrating the color correction device related to the embodiment 9. In FIG. 19, 1 denotes the input signal including the digitized image signal such as the R, G and B signals for the scanner, the R, G and B signals for the monitor, the R, G and B signals for CIE, the X, Y and Z signals for CIE, and L, a and b signals for CIE. Reference numeral 12 denotes the input block judging means to judge belonging to the block to divide the space (input space) comprising the input signal system. Reference numeral 14 denotes the output table referring means for obtaining the value of each apex of the block of the output space corresponding to the block judged by the input block judging means 12 by referring to the output table for rapid processing. Reference numeral 15 denotes the output signal generating means for generating the output signal using the value of each apex of the block of the output space obtained by the output table referring means 14 and the internal position obtained by the input block judging means 12. Reference numeral 6 denotes the output signal. The output signal 6 can be the R, G and B signals for the scanner, the R, G and B signals for the monitor, C, M and Y signals for the printer, R, G and B signals for CIE, the X, Y and Z signals for CIE, and L, a and b signals for CIE according to the content of the output table.

The input block judging means 12 divides each component of the input signal 1 by the common divisor of each component. The block divided by the above-mentioned lattice point is judged using the integer part of the quotient. The judged block number is transmitted to the output table referring means 14. The decimal part of the quotient is transmitted to the output signal generating means 15. The decimal part of the quotient is expressed as $k_0$, $k_1$, and $k_2$. When the common divisor is the power of two, the shift calculation is performed, and the block can be judged and $k_0$, $k_1$, and $k_2$ corresponding to the decimal part of the quotient can be obtained at higher speed.

Figure 20:
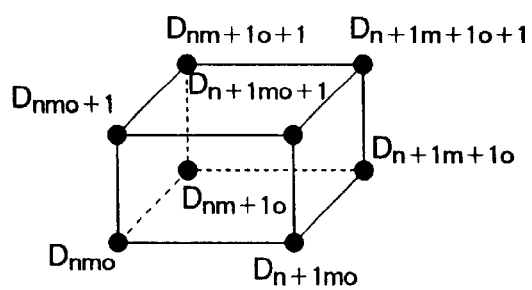
FIG. 20 is a divided block of an output table for rapid processing in embodiment 9 of the present invention.

The output table referring means 14 obtains the coordinate value of each apex of the block of the output space corresponding to the block number judged by the input block judging means 12 by referring to the output table for rapid processing. The obtained coordinate values are expressed as $D_{n\ m\ o}$, $D_{n+1\ m\ o}$, $D_{n\ m+1\ o}$, $D_{n\ m\ o+1}$, $D_{n+1\ m+1\ o}$, $D_{n+1\ m\ o+1}$, $D_{n\ m+1\ o+1}$, $D_{n+1\ m+1\ o+1}$. These coordinate values are indicated in FIG. 20.

The output signal generating means 15 obtains the output signal 6 using the decimal part $k_0$, $k_1$, and $k_2$ transmitted from the input block judging means 12 and the coordinate values $D_{n\ m\ o}$, $D_{n+1\ m\ o}$, $D_{n\ m+1\ o}$, $D_{n\ m\ o+1}$, $D_{n+1\ m+1\ o}$, $D_{n+1\ m\ o+1}$, $D_{n\ m+1\ o+1}$, $D_{n+1\ m+1\ o+1}$ transmitted from the output table referring means 14. The output signal 6 (symbol 0) is obtained based on the following formulae, where $T_{ijk}$ indicates the intermediate data. The intermediate data are obtained by the following formulae.

$$T_{n\ m\ o} = K_0 \times (D_{n+1\ m\ o} - D_{n\ m\ o})$$

$$T_{n m o+1} = K_0 \times (D_{n+1\ m\ o+1} - D_{n\ m\ o+1})$$

$$T_{n\ m+1\ o} = K_0 \times (D_{n+1\ m+1\ o} - D_{n\ m+1\ o})$$

$$T_{n\ m+1\ o+1} = K_0 \times (D_{n+1\ m+1\ o+1} - D_{n\ m+1\ o+1})$$

In addition, the intermediate data obtained by the above formulae are substituted in the right side of the following formulae to obtain the intermediate data.

$$T_{n\ m\ o} = K_1 \times (T_{n\ m+1\ o} - T_{n\ m\ o})$$

$$T_{n\ m\ o+1} = K_1 \times (T_{n\ m+1\ o+1} - T_{n\ m\ o+1})$$

Then, the intermediate data obtained by the above formulae are substituted in the right side of the formula below to obtain the output signal 6.

$$O = K_2 \times (T_{n\ m\ o+1} - T_{n\ m\ o})$$

As mentioned above, in embodiment 9, the table for rapidly processing corresponding to the divided block comprising the lattices divided with equal intervals for each component of the input signal space is used, and the content to be processed of the input block judging means 12 is simplified, and the internal position is also obtained at the same time, and the processing speed can be increased by one digit compared with that of embodiment 1.

Embodiment 10

Embodiment 10 is next described. Embodiment 10 is an example of the color correction application device for realizing each embodiment mentioned above.

Figure 21:
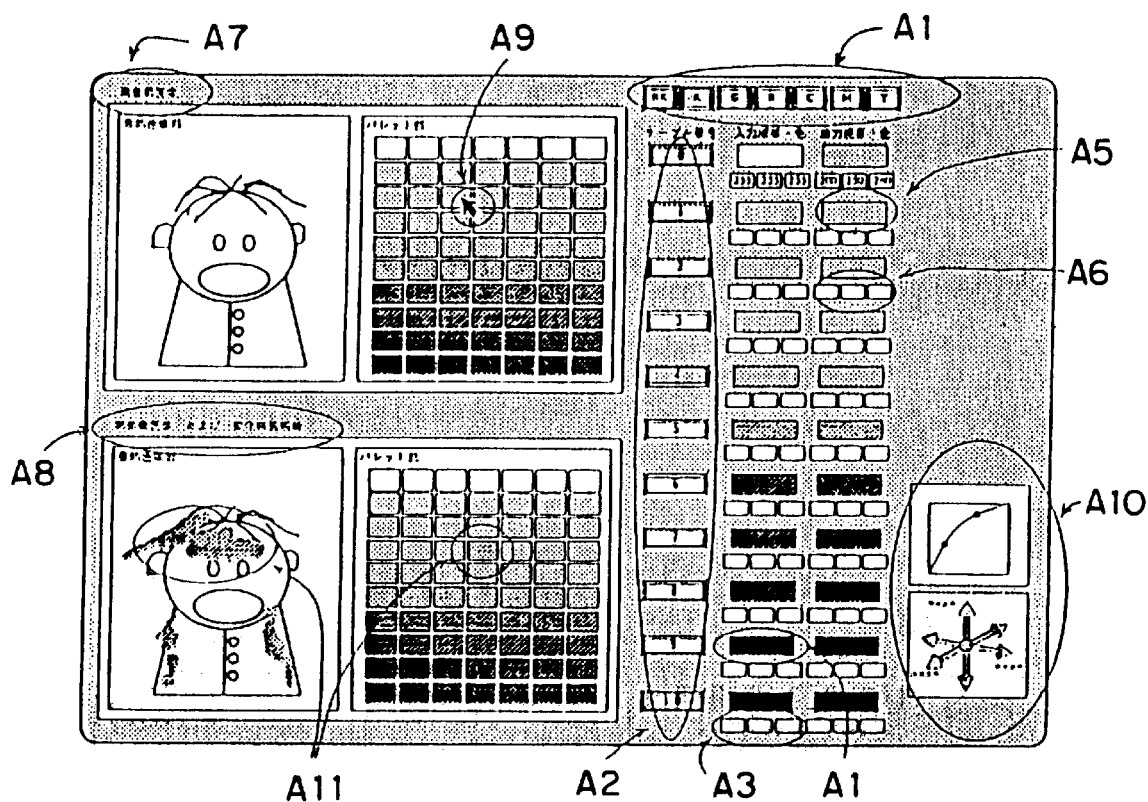
FIG. 21 is a constitution of the output table preparing device in embodiment 10 of the present invention.

FIG. 21 is a drawing used to explain the color correction application device having the output table preparing device related to the embodiment 10. In FIG. 21, A1 denotes the table locus selection element for selecting the achromatic locus and the chromatic locus changing from white to black, A2 denotes a table division point selection element for selecting the locus selected by the table locus selection element A1, A3 denotes the color indication element of the input division point to be indicated with the data of each input division coordinate point of the locus selected by the table locus selection element A1, A4 denotes the coordinate value indication and edition element of the input division coordinate point capable of indicating and editing the data of the input division coordinate point of the locus selected by the table locus selection element A1.

Reference numeral A5 denotes the color indication element of the output division point for indicating the data of each output division coordinate point of the locus selected by the table locus selection element A1 as the color, A6 denotes the coordinate value indication and edition element of the output division coordinate point capable of indicating and editing the data of the output division coordinate point of the locus selected by the table locus selection element A1, A7 denotes the pre-regulation image indication element for indicating the pre-regulation image, A8 denotes the post-regulation image indication element for indicating the post-regulation image, A9 denotes the color pick-up element for picking up the color from the pre-regulation image indication element A7 and receiving/delivering the data to the color indication element A3 of the input division point, A10 denotes the table coordinate value edition element for changing the color of the coordinate value of the input division point or the color of the coordinate value of the output division point, and A11 denotes the effect checking image indication element for indicating the image part to be affected by the edited table coordinate value.

The table data editing means for editing the coordinate value of the input division point and the coordinate value of the output division point of the output table in which the scanned value of each color patch corresponding to the locus division point number which is numbered sequentially from black to white of each locus is the coordinate value of the input division point and the colorimetered value of each color patch is the coordinate value of the output division point along the lightness direction, the saturation direction and the hue direction corresponding to the achromatic locus and the chromatic locus of the image comprises the color indication element A3 of the input division point, the coordinate value indication and edition element A4 of the input division coordinate point, the color indication element A5 of the output division point, the coordinate value indication and edition element A6 of the output division coordinate point, the color pick-up element A9, and the table coordinate value edition element A10, and a keeping means not indicated in the drawing to keep the output table which is prepared, corrected and regulated by the table data editing means is incorporated in the output table preparation device.

The details of each element are explained in detail below. The table locus selection element A1 selects the achromatic locus and the chromatic locus changing from white to black. In FIG. 21, buttons of Bk, R, G, B, C, M and Y are indicated, and as indicated in the above-mentioned embodiments, the number of the table loci is not limited to six. This number is determined according to the content of the table. Each button may be indicated with the color suitable for the color of the table locus. When the button is pressed, the color indication element A3 of the input division point, the coordinate value indication and edition element A4 of the input division coordinate point, the color indication element A5 of the output division point, and the coordinate value indication and edition element A6 of the output division coordinate point are changed. The elements A3–A6 are initially set to the table value of the locus selected by the table locus selection element A1.

The table division point selection element A2 instructs the division points to be corrected and regulated among the division points of the locus selected by the table locus selection element A1. One or more table division point selection elements A2 can be selected. When a plurality of elements are selected, correction and regulation are performed so that the selected division points are connected by the smooth curve. In addition, when the table division point selection element A2 is selected, the color region to be affected by correction and regulation is obtained by obtaining the input coordinate value included within a plurality of input blocks to which the locus selection value and the division point selection value to be selected based on the input division coordinate points of the selected division points, and the image part belonging to the color region is indicated by the effect checking image indication element A11.

The color indication element A3 of the input division point, the coordinate value indication and edition element A4 of the input division coordinate point, the color indication element A5 of the output division point, and the coordinate value indication and edition element A6 of the output division coordinate point respectively correct and regulate the table data (coordinate value) of the input division points and the output division points. The coordinate value indication and edition element directly changes the numerical values to correct and regulate the table data (coordinate value) of the input division points and the output division points. The color indication element corrects and regulates the table data (coordinate value) of the input division points and the output division points watching the color. The color indication elements and the coordinate value indication and edition elements of the same division point are interlocked with each other, and when one is corrected and regulated, the other is changed. Either of the input division point or the output division point may be selected by selecting the color indication element A3 of the input division point and the color indication element A5 of the output division point.

The pre-regulation image indication element A7 indicates the image before regulation. Any image to be corrected and regulated may be acceptable, but in order to improve the workability, the natural image or the image having the color pallet is used. The pre-regulation image indication element A7 has the image data value referring function, and the color data in the image can be directly seen by the numerical value.

The post-regulation image indication element A8 indicates the image after regulation. The image after regulation can be prepared by converting the image in accordance with the above-mentioned embodiment using the table corrected and regulated by the color indication element A3 of the input division point, the coordinate value indication and edition element A4 of the input division coordinate point, the color indication element A5 of the output division point, the coordinate value indication and edition element A6 of the output division coordinate point, and the table coordinate value edition element A10. The post-regulation image indication element A8 has the image data value referring function, and the color data in the image can be directly seen by the numerical value.

The color pick-up element A9 picks up the color from the pre-regulation image indication element A7 to receive/deliver the data. The picked-up data is delivered to the color indication element A3 of the input division point, the coordinate value indication and edition element A4 of the input division coordinate point, the color indication element A5 of the output division point, and the coordinate value indication and edition element A6 of the output division coordinate point. The contents of the color indication element and the coordinate value indication edition element are changed following the delivered data.

The table coordinate value edition element A10 changes the color of the coordinate value of the input division point or the color of the coordinate value of the output division point using a tool. Though the coordinate value is directly inputted or the color is directly designated by the color indication element A3 of the input division point, the coordinate value indication and edition element A4 of the input division coordinate point, the color indication element A5 of the output division point, and the coordinate value indication and edition element A6 of the output division coordinate point, the table coordinate value edition element A10 designates the color or the coordinate value by more complicate method.

Figure 22:
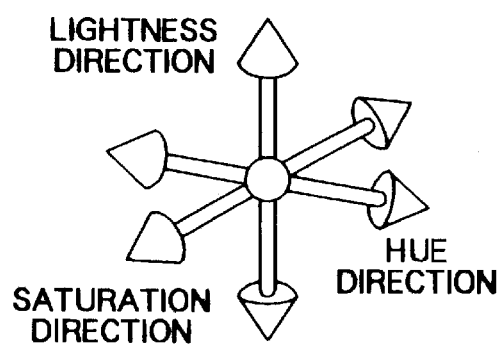
FIG. 22 is an explanatory figure of the table coordinate value editing element in embodiment 10 of the present invention.
Figure 23:
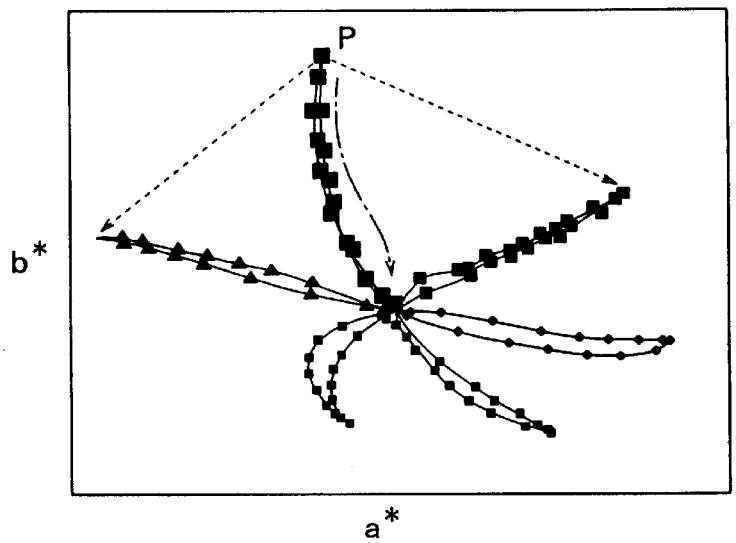
FIG. 23 is an explanatory figure of the table coordinate value editing element in embodiment 10 of the present invention.

FIG. 21 shows the tool for changing the color of the coordinate value of the division point in the hue direction, the saturation direction and the lightness direction in the present invention, and the tool to change the color of the coordinate value of the division point by changing the curve using a graph. FIG. 22 and FIG. 23 show the details of these tools. FIG. 22 shows the tool for changing the color of the coordinate value of the division point in the hue direction, the saturation direction and the lightness direction in the present invention. When the button (indicated by a conical body in the drawing) in the hue direction, the saturation direction and the lightness direction is depressed, the table value is changed according to the kind of the button. For example, when the output division point of yellow n is selected using the table locus selection element A1, the table division point selection element A2, the color indication element A3 of the input division point, and the color indication element A5 of the output division point, the table value of the output division point of yellow n is changed along the line comprising the following output division points.

Hue direction: along the line to connect red n, yellow n, and green n

Saturation direction: along the line to connect gray n and yellow n

Lightness direction: along the line to connect yellow n−1, yellow n, yellow n+1.

FIG. 23 shows the tool for changing the color of the coordinate value of the division points by changing the curve using a graph. In FIG. 23, the output table is plotted on the a*b* plane of CIELAB. When the point P is edited, the point P is moved along the dotted line when the color is changed in the hue direction, and along the one-dot chain line when the color is changed in the saturation direction. In the drawing, the point P is moved on the a*b* plane, but in the present invention, the table value is changed along the direction explained by the tool to change the color of the coordinate value of the division point in the hue direction, the saturation direction and the lightness direction. In addition, even when the point P is edited free from any restriction in the hue direction, the saturation direction and the lightness direction, the table value is changed on the plane constituted by the line in the direction explained by the tool to change the color of the coordinate value of the division point in the hue direction, the saturation direction and the lightness direction.

The effect checking image indication element A11 indicates the image part to be affected by the edited table coordinate value. When the table division point selection element A2 is selected, the color region to be affected by correction and regulation is obtained based on the input division coordinate point of the selected division point, and the image part belonging to the color region is indicated.

Figure 24:
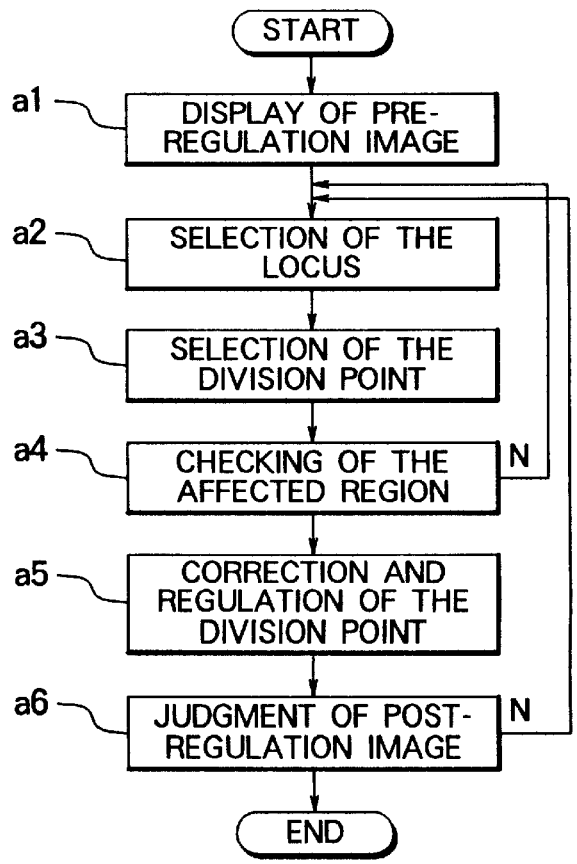
FIG. 24 is a flow-chart illustrating the procedure for preparing and correcting the output table in embodiment 10 of the present invention.
Figure 25:
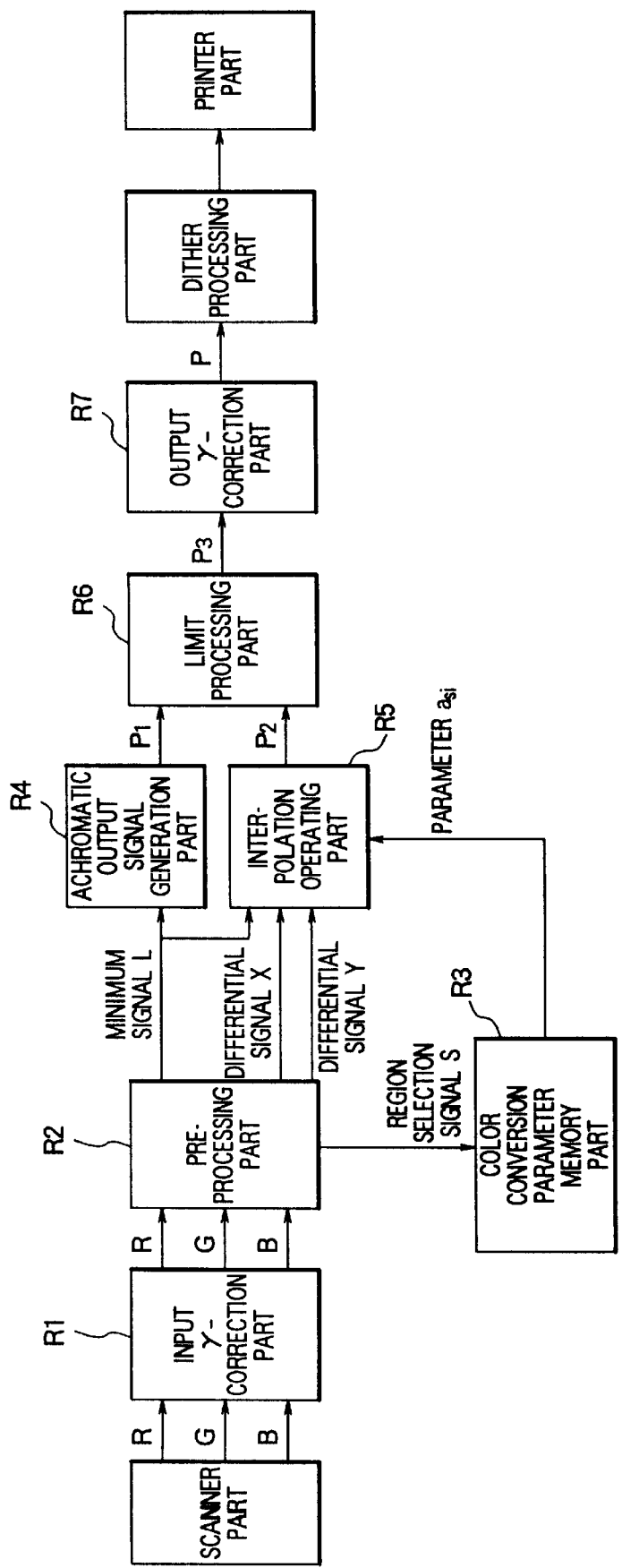
FIG. 25 is a block diagram used to explain the method and the device for color conversion in the conventional example 1 (Japanese Unexamined Patent Publication No. 6-86059)
Figure 26:
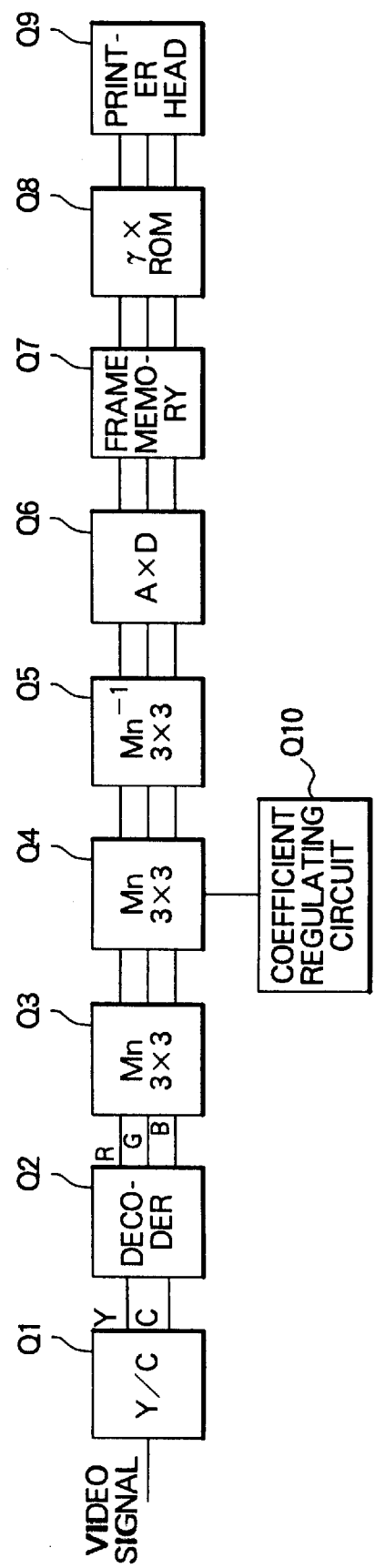
FIG. 26 is a block diagram used to explain the method and the device for color conversion in the conventional example 2 (U.S. Pat. No. 5,333,070).

The operation of the output table preparing device A is next explained referring to FIG. 24. FIG. 24 indicates the procedure for preparing, correcting and regulating the output table using the output table preparing device A.

To begin with, pre-regulation image indication (sign a1 indicated in FIG. 24) is performed. The image to be regulated is indicated using the pre-regulation image indication element A7. Then, the locus selection (sign a2 indicated in FIG. 24) is performed. The locus is selected using the table locus selection element A1. Then, the division point selection (sign a3 indicated in FIG. 24) is performed. This is performed using the table division point selection element A2.

Next, the region to be affected is checked (sign a4 indicated in FIG. 24). When the locus selection (sign a2 indicated in FIG. 24) and the division point selection (sign a3 indicated in FIG. 24) is performed, the color region to be affected by correction and regulation is obtained using the locus selection value and the division point selection value within the output table preparing device A. In the color region, the input coordinate value included in a plurality of input blocks to which the locus selection value and the division point selection value belong can be obtained in accordance with the above-mentioned embodiment. Then, the color region to be affected by correction and regulation can be indicated by the effect checking image indication element A11. Judgment is made whether the color region is corrected and regulated by the indication. When it is not appropriate, the procedure returns to the locus selection (sign a2 indicated in FIG. 24). When it is appropriate, the procedure advances to the following procedure.

In correction and regulation of the division points (sign a5 indicated in FIG. 24), the color of the input division point, the coordinate value of the input division coordinate point, the color of the output division point, and the coordinate value of the output division coordinate point are corrected and regulated using various elements. When the coordinate value of the division point is directly corrected and regulated, it is corrected and regulated using the coordinate value indication and edition element A4 of the input division coordinate point and the coordinate value indication and edition element A6 of the output division coordinate point.

When correction and regulation is performed watching the color of the division points, the color indication element A3 of the input division point and the color indication element A5 of the output division point are used. The color pick-up element A9 picks up the color from the pre-regulation image to receive/deliver the data. More complicated correction and regulation is performed using the table coordinate value edition element A10. This is performed along the hue direction, the saturation direction and the lightness direction in the present invention, or by changing the curve of the graph to be used.

When the output table is corrected and regulated using various elements, the pre-regulation image is converted in the procedure described in the above-mentioned embodiment within the output table preparing device A. The converted image is indicated using the post-regulation image indication element A8. Then, the post-regulation image judgment (sign a6 indicated in FIG. 24) is performed. Judgment is made whether or not the indicated image is appropriate. When it is not appropriate, the procedure returns to the locus selection (sign a2 indicated in FIG. 24). When it is appropriate, the operation to keep the corrected and regulated output table are performed and completed.

As mentioned above, in embodiment 10, various elements for making complicated operations such as preparation, correction and regulation of the output table easily understandable are prepared, and the effect of the changed part of the table on the image is clearly understood, and orientation of color regulation can be given.

In embodiment 10, the pre-regulation image indication element A7 and the post-regulation image indication element A8 are arranged on the same output device as the regulation instruction element group (A1–A6, A9–A11), but they may be arranged on a different output device with similar effect as that in embodiment 10, and various output devices can be prepared, corrected and regulated and the workability is also improved.

In addition, the pre-regulation image indication element A7 and the post-regulation image indication element A8 may be arranged on a plurality of output devices so as to perform correction and regulation taking into consideration the differences in the output devices. Similar effects to that of embodiment 10 are obtained, together with the effect that the output device across the output devices can be prepared, corrected and regulated while checking a plurality of devices at the same time.

Industrial Applicability

As mentioned above, in the present invention, color interpolation can be performed along the locus of the color change of the input signal by dividing the color space of the input signal into the blocks to surely include the locus changing from black to white passing through the center part based on the chromatic locus and the achromatic locus changing from black to white surrounding the color region capable of handling the input image equipment, and at the same time, the achromatic part present in the center part of the color space can be handled separately from the chromatic part present in the peripheral part of the color space, and moreover, gradation of each locus can be handled separately, and the color control of the system to handle the color image equipment is facilitated.

What is claimed is:

1. A color correction device which converts an input signal from a first signal coordinate system to a second coordinate system, comprising:
   an input block judging means which selects a block of divided input space corresponding to an input signal system to which the input signal belongs;

an input block internal position calculating means calculating a position in the block selected by said input block judging means at which the input signal is located;

an output table referring means obtaining from an output table a value of each apex of a block in an output space corresponding to the block selected by said input block judging means; and an output signal generating means generating an output signal using the value of each apex of the block in the output space obtained by said output table referring means and the internal position obtained by said input block internal position calculating means;

wherein the divided input space is divided at division points of each locus of an achromatic color present in a center part of a color region and a plurality of chromatic colors present in a peripheral part of the color region, and includes divided blocks in which gradation in the lightness direction for each locus is separated, said input block judging means and selects the block in which the input signal is judged to be inside every plane of the divided block.

2. The color correction device according to claim 1, wherein said output table referring device includes a table prepared with a scanned value of each of a plurality of color patches corresponding to locus division point numbers numbered sequentially from black to white along each locus as a coordinate value of an input division point and a colorimetered value of each color patch as a coordinate value of an output division point as said output table, and said output table referring device performs color regulation and control by changing and correcting either of said coordinate value of the input division point or said coordinate value of the output division point.

3. The color correction device according to claim 1, wherein said divided input space is divided into blocks which each include a locus changing from black to white through a center part of the color region based on chromatic loci changing from black to white surrounding a color region and an achromatic locus changing from black to white through the center part of the color region, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

4. The color correction device according to claim 1, wherein said input space is divided into tetrahedrons, each including division points on the achromatic locus changing from black to white through the center part of at least one color region, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

5. The color correction device according to claim 1, wherein said divided input space is a color region divided based on a plurality of chromatic loci changing from black to white having different saturation levels, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

6. The color correction device according to claim 1, wherein said divided input space is a color region divided based on a plurality of chromatic loci changing from black to white and having different saturation levels, and includes tetrahedron-shaped blocks, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

7. The color correction device according to claim 1, wherein said divided input space is a color region divided based on a plurality of chromatic loci changing from black to white and having different hue levels, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

8. The color correction device according to claim 1, wherein the selected block is divided by a conical body having the input signal as the apex, said input block internal position calculating means sets the internal position based on the volume of said conical body, and obtains the internal position from the ratio of the volume of the divided block to diagonal block, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

9. The color correction device according to claim 1, wherein said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

10. A color correction device which changes an input signal to be inputted as image data from a first signal coordinate system to a second signal coordinate system, comprising:

an input block judging means selecting a block from a divided input space representing an input signal system, the input space being divided into blocks comprising lattices divided with equal intervals for each of a plurality of input signal components, said input block judging means selecting the block where each component of the input signal is divided by a common divisor of each component and which is divided using an integer part of a quotient, said input block judging means outputting the selected block number and a decimal part of said quotient;

an output table referring means which has an output table for rapid processing where a coordinate value of each apex of a block in an output space which corresponds to the block number is stored, and obtains the coordinate value of each apex of the block in the output space corresponding to the block number selected by said input block judging means by referring to said output table for rapid processing; and an output signal generating means obtaining the output signal using the decimal part of said quotient the output from said input block judging means and the coordinate value output from said output table referring means.

11. A color correction method which converts an input signal to be inputted as image data from a first signal coordinate system to a second coordinate system, comprising:

selecting a block of divided input space corresponding to an input signal system to which the input signal belongs;

calculating at which internal position in the block selected by said selecting step the input signal is located;

referring to an output table to obtain a value of each apex of a block in an output space corresponding to the block selected by said selecting step; and generating an output signal using the value of each apex of the block in the output space obtained by referring to the output table and the internal position obtained by said calculating step;

wherein said input space is divided at division points of each locus of achromatic color present in a center part of a color region and a plurality of chromatic colors present in a peripheral part of the color region, and includes divided blocks in which gradation level in a lightness direction for each locus is separated, and said selecting step selects the block in which the input signal is judged to be inside every plane of the block.

12. The color correction method according to claim 11, wherein said step of referring to the output table performs color regulation and control by changing and correcting either of a coordinate value of the input division point or a coordinate value of the output division point of the output table, said output table having been prepared with a scanned value of each of a plurality of color patches corresponding respectively to locus division point numbers numbered sequentially from black to white of each locus as a coordinate value of an input division point and a colorimetered value of each of the plurality of color patches as a coordinate value of an output division point.

13. The color correction method according to claim 11, wherein said divided input space is divided into blocks which each include a locus changing from black to white through a center part of the color region and are divided based on chromatic loci changing from black to white surrounding the color region and an achromatic locus changing from black to white through the center part of the color region, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

14. The color correction method according to claim 11, wherein said divided input space is divided into tetrahedron blocks including division points on an achromatic locus changing from black to white through a center part of at least one color region, said output table referring means is provided with a first output table for converting a signal to be converted with a coordinate value of an input division point comprising a device value and a coordinate value of an output division point comprising a standard color space value into a signal of the standard color space, and a second output table for converting a signal of the standard color space with the coordinate value of the input division point comprising the standard color space value and the coordinate value of the output division point comprising the device value into a signal of the device color space as said output table, and said output table referring means is capable of converting a signal of one device to a signal of another device using the standardized color conversion of said first output table and then, using the individualized color conversion of said second output table.

15. A color correction application device which corrects and regulates color by preparing an output table and changing the content of the output table, said color correction application device having an output table preparing device, comprising:

a pre-regulation image indicating means indicating a pre-regulation image;

a table locus selecting means selecting an achromatic locus and a chromatic locus of the image;

a table division point selecting means selecting a division point to be corrected and regulated among division points of the locus selected by said table locus selecting means;

an effect checking image indicating means obtaining a color region to be affected by correction and regulation by obtaining an input coordinate value included in a plurality of input blocks to which a locus value and a division point value for the locus and division point selected by said table locus selecting means and said table division point selecting means respectively belong, and indicating an image part belonging to the color region;

a table data editing means editing the coordinate value of the input division point and the coordinate value of the output division point of the output table with the scanned value of each color patch corresponding to the number of the locus division point to be sequentially numbered from black to white of each locus for said color region as the coordinate value of the input division point and the colorimetered value of each color patch as the coordinate value of the output division point along the lightness direction, the saturation direction and the hue direction corresponding to the achromatic locus and the chromatic locus of the image;

a keeping means keeping the output table to be corrected and regulated by said table data editing means; and a post-regulation image indicating means converting the pre-regulation image using the output table to be corrected and regulated by said table data editing means and indicate the post-regulation image.

16. The color correction application device according to claim 15, wherein said pre-regulation image indicating means and said post-regulation image indicating means are arranged on different output devices.

17. The color correction application device according to claim 15, wherein said pre-regulation image indicating means and said post-regulation image indicating means are arranged on a plurality of output devices.

18. An output table preparation device, comprising:

a color patch preparation means for preparing color patches along a locus that smoothly changes from black to white;

a scan processing means for obtaining scanned values by scanning each color patch;

a colorimeter processing means for obtaining colorimetered values for each color patch;

an output table preparing means for preparing an output table with the scanned values of each color patch as coordinate values of input division points and the colorimetered values as coordinate values of output division points;

a common divisor calculating means for obtaining a common divisor for each component of an input signal of said output table;

a lattice forming means for dividing input signal space by each common divisor, thereby forming lattices divided with equal intervals for each component; and an output table for rapid processing preparation means for obtaining output signals corresponding to input signals as coordinate value of every lattice point, thereby preparing an output table for rapid processing.

* * * * *